(12) United States Patent
Wu et al.

(10) Patent No.: US 7,721,340 B2
(45) Date of Patent: May 18, 2010

(54) REGISTRY PROTECTION

(75) Inventors: Wei Wu, Redmond, WA (US); Julie D Bennett, Medina, WA (US); Frank Nian-Tzu Chu, Sammamish, WA (US); Mohammed El-Gammal, Woodinville, WA (US); Simon D Earnshaw, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1093 days.

(21) Appl. No.: 11/061,399

(22) Filed: Feb. 17, 2005

(65) Prior Publication Data

US 2006/0005248 A1    Jan. 5, 2006

Related U.S. Application Data

(60) Provisional application No. 60/578,937, filed on Jun. 12, 2004.

(51) Int. Cl.
G06F 11/00 (2006.01)
G06F 12/14 (2006.01)
G06F 12/16 (2006.01)
G08B 23/00 (2006.01)

(52) U.S. Cl. .................................................. 726/27
(58) Field of Classification Search .................... 726/27
See application file for complete search history.

(56) References Cited

U.S. PATENT DOCUMENTS

| | | | |
|---|---|---|---|
| 5,748,739 A | 5/1998 | Press | |
| 5,794,232 A * | 8/1998 | Mahlum et al. | 707/3 |
| 5,802,368 A | 9/1998 | Grigsby et al. | |
| 5,845,129 A | 12/1998 | Wendorf et al. | |
| 5,915,019 A | 6/1999 | Ginter et al. | |
| 6,006,328 A | 12/1999 | Drake | |
| 6,236,971 B1 | 5/2001 | Stefik et al. | |
| 6,731,756 B1 | 5/2004 | Pizano et al. | |
| 6,978,303 B1 * | 12/2005 | McCreesh et al. | 709/224 |
| 7,000,100 B2 | 2/2006 | Lacombe et al. | |
| 7,146,505 B1 | 12/2006 | Harada et al. | |
| 7,281,271 B1 | 10/2007 | Szor | |
| 7,424,615 B1 | 9/2008 | Jalbert et al. | |

(Continued)

FOREIGN PATENT DOCUMENTS

WO    WO 99/01815 A1    1/1999

(Continued)

OTHER PUBLICATIONS

Labir, E., "Unpacking by Code Injection," *The CodeBreakers Journal* 1(2):1-16, 2004.

(Continued)

*Primary Examiner*—Kambiz Zand
*Assistant Examiner*—Jason K Gee
(74) *Attorney, Agent, or Firm*—Wolf, Greenfield & Sacks, P.C.

(57) ABSTRACT

Tampering with pieces of software is inhibited. Registry protection prevents changes made to keys and values in a central hierarchical database. Hardware protection prevents hackers from forcing various pieces of software from running on unauthorized pieces of hardware. The obfuscation of a software image so as to becloud the comprehension of hackers in reverse engineering pieces of software comprising the software image is provided. Image verification ensures the originality of the pieces of software to be installed.

20 Claims, 30 Drawing Sheets

U.S. PATENT DOCUMENTS

| | | | |
|---|---|---|---|
| 2001/0027383 A1* | 10/2001 | Maliszewski | 702/188 |
| 2002/0002678 A1 | 1/2002 | Chow et al. | |
| 2002/0062451 A1 | 5/2002 | Scheidt et al. | |
| 2003/0097577 A1 | 5/2003 | Sotoodeh et al. | |
| 2003/0208562 A1* | 11/2003 | Hauck et al. | 709/219 |
| 2004/0107368 A1 | 6/2004 | Colvin | |
| 2004/0158708 A1 | 8/2004 | Peyravian et al. | |
| 2004/0260953 A1* | 12/2004 | Jamieson et al. | 713/202 |
| 2005/0044359 A1* | 2/2005 | Eriksson et al. | 713/165 |
| 2005/0125684 A1* | 6/2005 | Schmidt | 713/200 |

FOREIGN PATENT DOCUMENTS

| | | |
|---|---|---|
| WO | WO 03/007571 A1 | 1/2003 |

OTHER PUBLICATIONS

PCT/US05/20638, International Search Report and Written Opinion, Jan. 18, 2006.

"Code Integrity (ci.dll) Security Policy," http://csrc.nist.gov/groups/STM/cmvp/documents/140-1/140sp/140sp890.pdf, printed out in 2008 (pp. 1-6).

"Description of El-Gammal (one of the inventors)," http://www.linkedin.com/pub/5/985/36, printed out in 2008 (pp. 1-2).

"Library (computing)," *Wikipedia,* http://en.wikipedia.org/wiki/library_(computing) printed out in 2008 (pp. 1-8).

"List of Unicode Directors," *Unicode Consortium,* http://unicode.org/consortium/directors.html, printed out in 2008, which includes Julie Bennett of Microsoft (pp. 1-9).

"Sorting it all Out," *MSDN Blogs,* http://blogs.msdn.com/michkap/archive/2005/02/12/371650.aspx, including a section on Julie Bennett, printed out in 2008.

"Unicode Directors," *Unicode Consortium,* http://unicode.org/consortium/directors.html, listing Julie Bennett, printed out in 2008 (pp. 1-9).

Baldi et al. "The TrustedFlow™ Protocol Idiosyncratic Signatures for Authenticated Execution" copyright 2002, presented in Jun. 2003 at West Point, New York (15 pages).

Eyers et al., "Compile-Time Enforcement of Dynamic Security Policies," *IEEE Workshop,* pp. 119-126 (2008).

Jochen et al., "Towards the Safe Use of Dynamically Transformed Itinerant Software," *Univ. of Delaware* (printed 2008) 7 pages.

Kaplan, Michael, "Lunch with Julie Bennett," *MSDN Blogs—Sorting it all Out ,* http://blogs.msdn.com/michkap/archive/2005/02/12/371650.aspx, printed out in 2008 (pp. 1-7) (see pp. 2 and 3).

Madou et al. "Software Protection Through Dynamic Code Mutation" *In Information Security Applications,* (2005) pp. 371-385.

Memon et al., "Preventing Reverse Engineering Threat in Java Using Byte Code Obfuscation Techniques," *IEEE-ICET,* pp. 689-694 (2006).

Microsoft, Creating and Using Dynamic Library, http://msdn.microsoft.com/en-us/library/ms235636(VS.80).aspx, printed out in 2008 (pp. 1-6).

Petkac et al., "Security Agility for Dynamic Execution Environments," *DARPA contract* (printed 2008).

Preda et al., "Control Code Obfuscation by Abstract Interpretation," *IEEE,* 10 pages (2005).

Udupa et al., Deobfuscation Reverse Engineering Obfuscated Code, *IEEE,* 10 pages (2005).

* cited by examiner

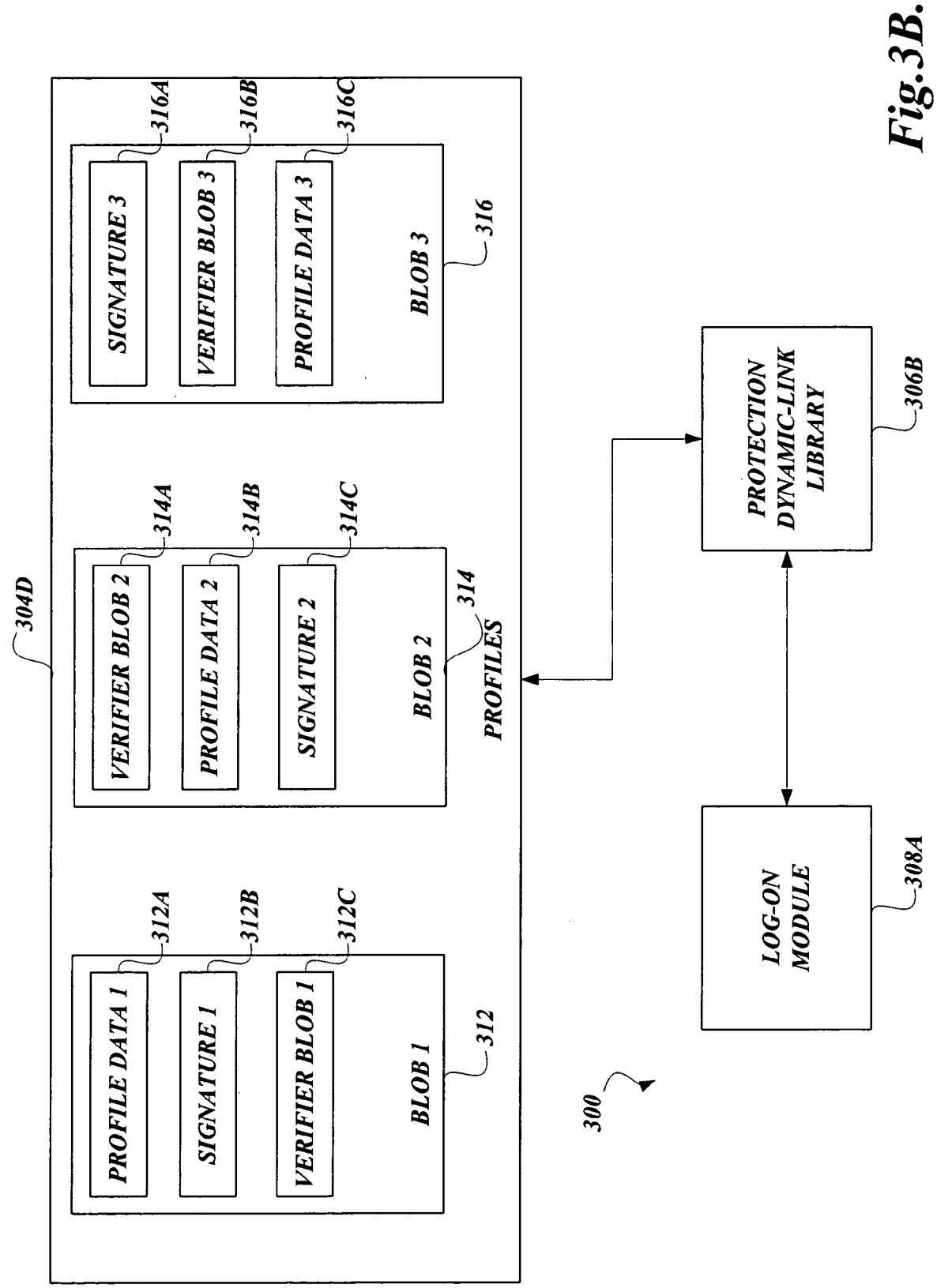

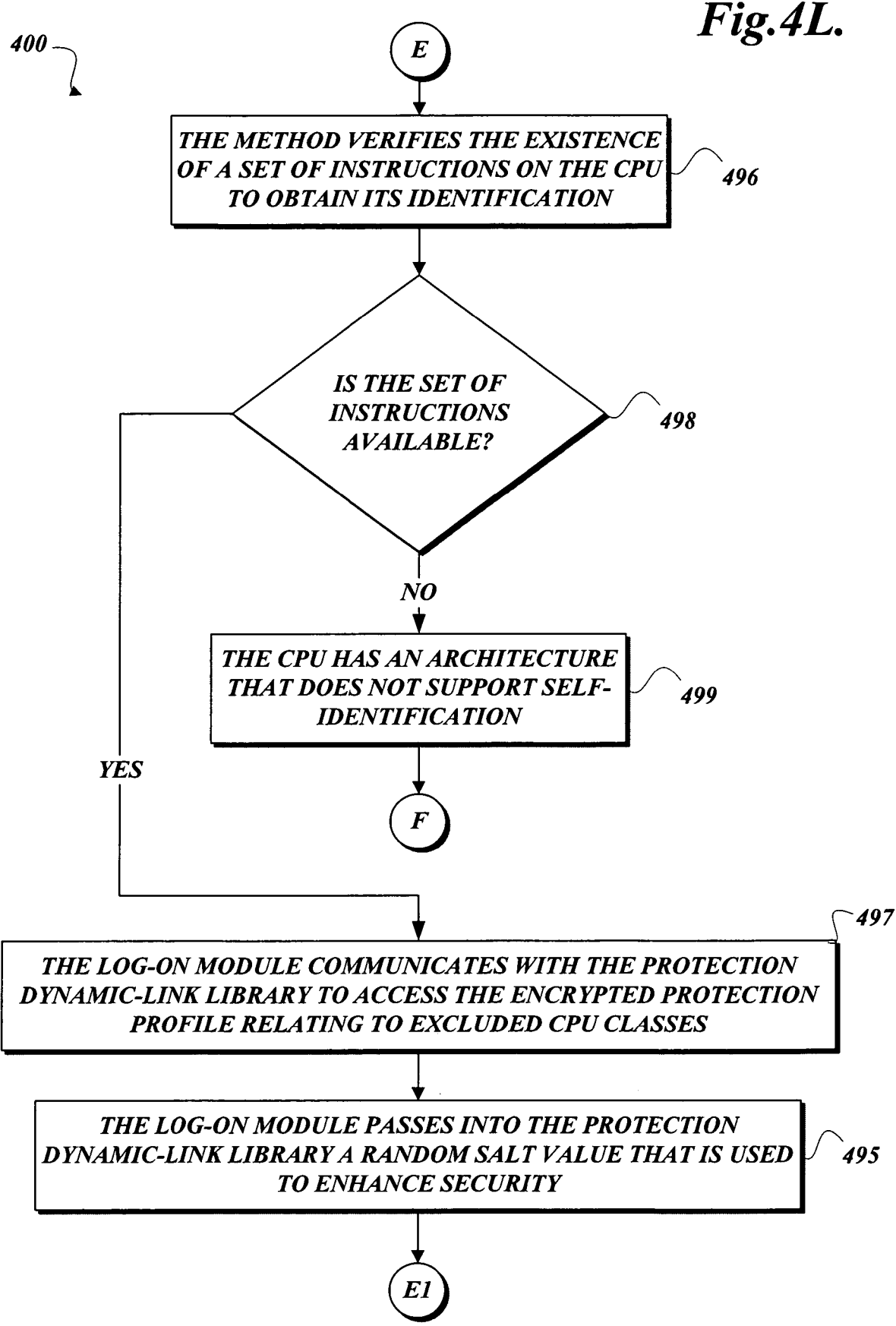

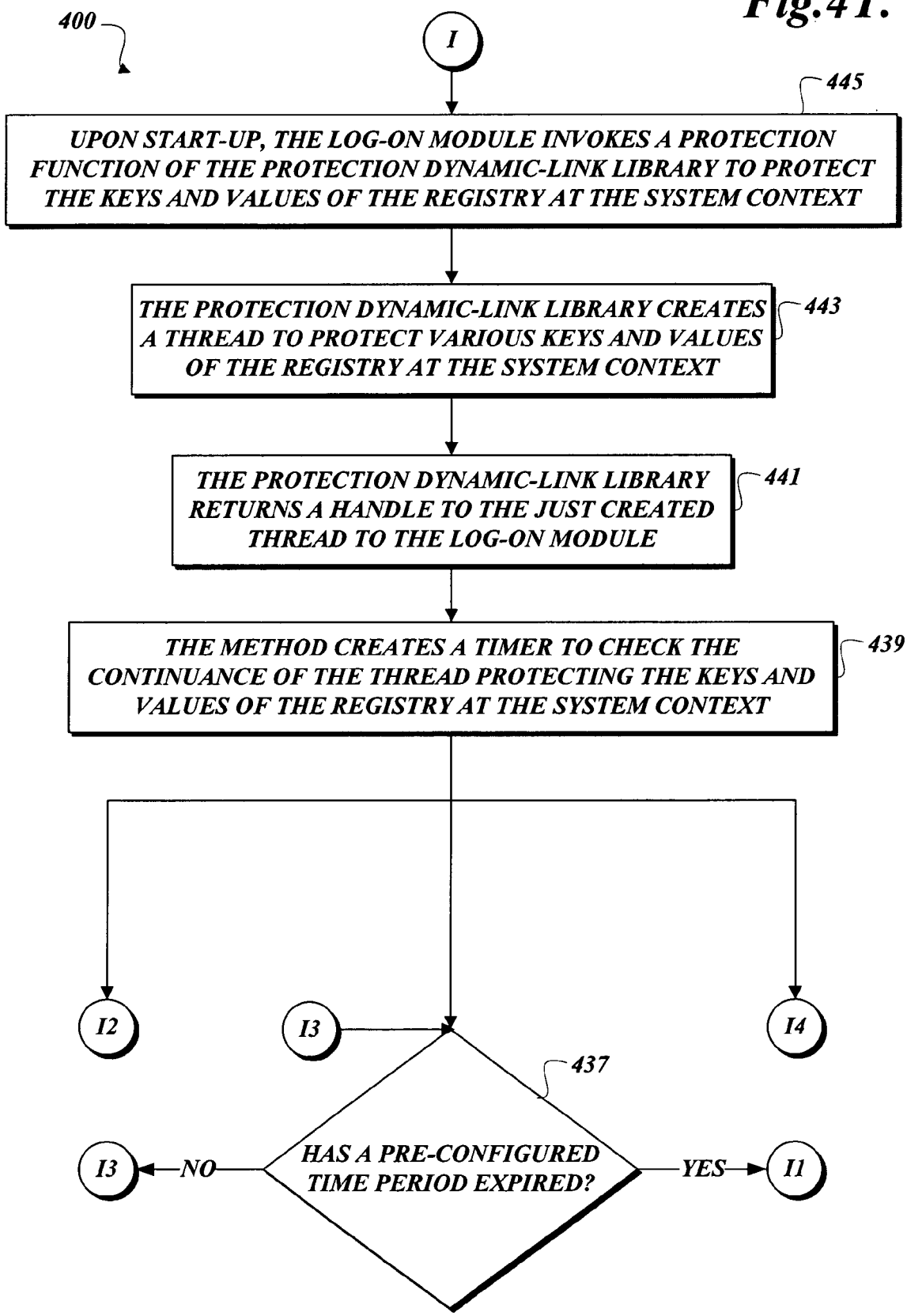

REGISTRY PROTECTION

CROSS-REFERENCES TO RELATED APPLICATIONS

This application is a continuation of application Ser. No. 11/061,791, filed Feb. 17, 2005; application Ser. No. 11/061,280, filed Feb. 17, 2005; application Ser. No. 11/062,238, filed Feb. 17, 2005; application Ser. No. 11/062,237, filed Feb. 17, 2005; application Ser. No. 11/061,484, filed Feb. 17, 2005; application Ser. No. 11/061,790, filed Feb. 17, 2005; application Ser. No. 11/061,792, filed Feb. 17, 2005; and application Ser. No. 11/061,411, filed Feb. 17, 2005, and further claims the benefit of U.S. Provisional Application No. 60/578,937, filed Jun. 12, 2004, all of which are incorporated herein by reference.

FIELD OF THE INVENTION

The present invention relates generally to security, and more particularly, to inhibiting software tampering by preventing modification by unauthorized individuals or unauthorized pieces of software.

BACKGROUND OF THE INVENTION

Software makes computing machines powerful. Such machines can correct the irregular rhythm of a person's defective heart or let people reach for the constellations of the heavens. Yet, software is vulnerable to something as simple as accidental mischief or intentional harm. Accidental mischief may innocently come from a child who somehow gains access to his parents' personal computer, causing physical loss of data or changing settings that are detrimental to the use of the computing machine, among other examples. Intentional harm is typically instigated by a "hacker," which is a dysphemism for a person who uses computing expertise for illicit ends, such as by causing malicious software to execute on computing machines or directly gaining access to computing machines without permission and tampering with programs and data.

Operating systems are software that controls the allocation and usage of computing machine resources such as memory, central processing unit (CPU) time, disk space, and peripheral devices. The operating system is the foundation software on which applications depend. Popular operating systems include Windows 98, Windows NT, Windows XP, Mac OS, UNIX, and Linux. Operating systems are sometimes packaged in a way that is appropriate for a particular market. For example, a powerful operating system used for the small niche server market can be retrofitted by the software manufacturer in various ways that are appropriate for novice users in the large general consumer market. One problem is that novice users may inadvertently modify the retrofitted operating system, thereby crippling it. The most pernicious problem of all, however, is that hackers can reverse engineer the retrofitted operating system so as to transform it for use for other illicit purposes to the detriment of the software manufacturer. FIG. 1 illustrates this problem and other problems in greater detail.

A software image 108 represents a duplicate or copy of an operating system containing instructions that make computer hardware work. A hacker or his malicious software 102 can modify the software image 108 or cause it to be easily replaced because the software image 108 is typically a file stored somewhere in the computer hardware. The next time users 110 invoke the software image to run system software, such as the operating system, the modified or supplanted software image is run instead of the original provided by the software manufacturer.

The tampering of the software image 108 is typically carried out by hackers or pieces of malicious software 102, but rarely by users 110. However, a registry 106 can be unintentionally tampered with by the users 110, as well as by hackers or pieces of malicious software 102. The registry 106 is a piece of system software used to store information that can be employed to configure the system for one or more users, applications, and hardware devices. For example, the registry could be used to enable three dimensional rendering and hardware acceleration support for consumer computing machines while disabling those same features for server computing machines.

These pieces of information can be changed when users 110 act with administrative permission, or by hackers or pieces of malicious software 102 that improperly obtain permission to modify the registry. Hackers and pieces of malicious software 102 can attempt to manipulate the registry 106 to overcome licensing restrictions so as to change information in the registry, registry settings, and unlock additional features that were not meant for a particular audience or marketing channel. One issue is that modification of the registry may cause the computing machine to stop working or to exhibit unpredictable behaviors.

Another problem involves tampering with executing software 104. Hackers, or pieces of malicious software 102, can improperly jettison properly executing software 104 and supplant it with unauthorized or prohibited software services. Moreover, hackers or pieces of malicious software 102 can emulate software responses or software calls and tamper with the running of the executing software 104.

Given the problems of software tampering, both by accidental mischief or intentional harm, it will come as no surprise that unscrupulous hackers and their malicious software can cause software to be vulnerable. Without a resolution to the problem of software tampering, users may eventually no longer trust computer manufacturers to provide a secure computing experience while preventing access by unauthorized individuals. Thus, there is a need for a system, method, and computer-readable medium for securing software while avoiding or reducing the above problems associated with existing systems.

SUMMARY OF THE INVENTION

In accordance with this invention, a system, method, and computer-readable medium for inhibiting software tampering is provided. The method form of the invention includes a method for inhibiting software tampering. The method comprises upon start-up of a computing machine, invoking by a log-on module a protection function of an obfuscated dynamic link library to create a first thread that protects keys and values of a central hierarchical database associated with the system. The method further comprises upon log-on to the computing machine by a user, invoking by the log-on module the protection function of the obfuscated dynamic link library to create a second thread that protects keys and values of the central hierarchical database associated with the user.

In accordance with further aspects of this invention, a computer-readable medium form of the invention includes a computer-readable medium having computer-executable instructions thereon for implementing a method for inhibiting software tampering. The method comprises upon start-up of a computing machine, invoking by a log-on module a protection function of an obfuscated dynamic link library to create a first thread that protects keys and values of a central hierarchical database associated with the system. The method further comprises upon log-on to the computing machine by a user, invoking by the log-on module the protection function of the obfuscated dynamic link library to create a second thread that protects keys and values of the central hierarchical database associated with the user.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 3B is a block diagram illustrating exemplary profiles stored either in a registry or a dynamic-link library and the extraction of profiles by the safe interoperation of pieces of software, in accordance with one embodiment of the present invention.

DETAILED DESCRIPTION OF THE PREFERRED EMBODIMENT

It is a dichotomy of software that it is powerful but vulnerable. Various embodiments of the present invention inhibit tampering with pieces of software. One embodiment is the obfuscation of a software image so as to becloud the comprehension of hackers in reverse engineering pieces of software comprising the software image. Another embodiment is verifying whether the pieces of software together constitute a software package that requires protection from tampering. As yet another embodiment is determining whether the hardware resources, such as the central processing unit or the cache memory on a computing machine, belong to a class for which inhibiting software tampering is possible. A further embodiment includes checking whether certain critical files on the computing machine have been tampered with. An additional embodiment includes determining whether the registry has been tampered with. Some other embodiments include determining whether software services that are executing have been tampered with.

Figure 1:
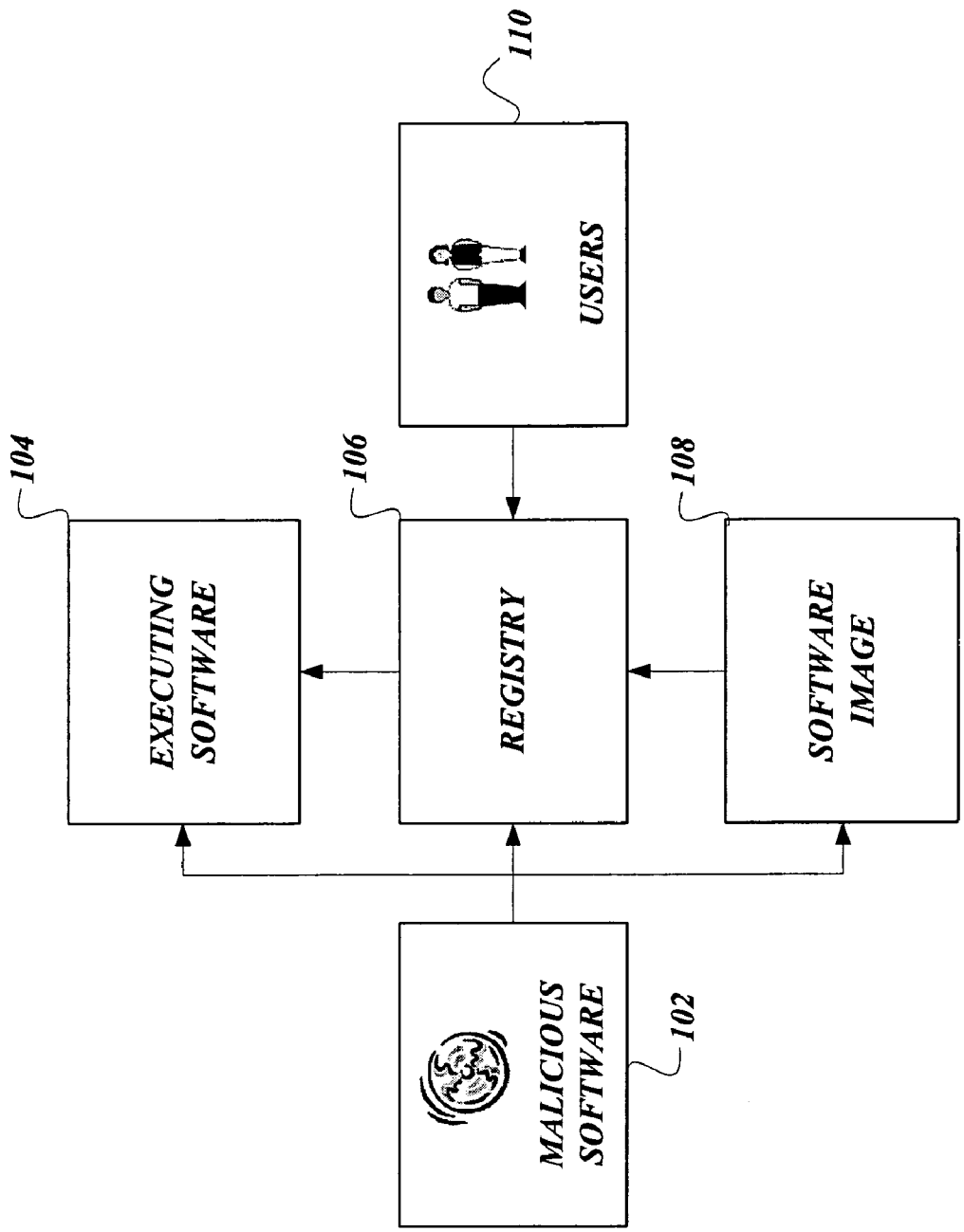
FIG. 1 is a block diagram illustrating a conventional system showing problems of software tampering in computing machines by unauthorized individuals.
Figure 2:
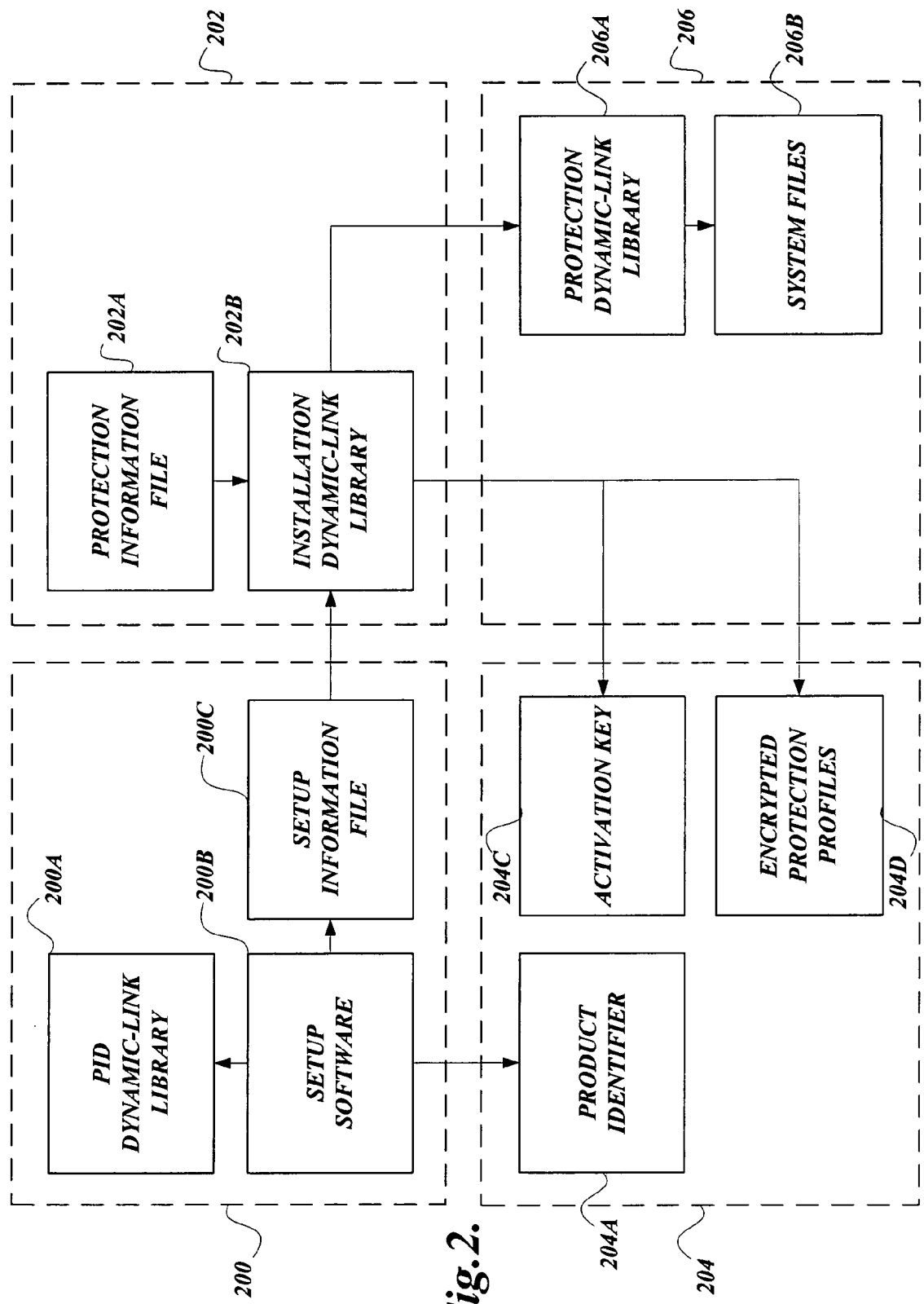
FIG. 2 is a block diagram illustrating exemplary software components for setting up pieces of software to inhibit tampering.

FIG. 2 illustrates a software component 200, which includes a product identifier (PID) dynamic-link library 200A, setup software 200B, and setup information file 200C. The setup software component 200 is responsible for determining whether a piece of software for inhibiting tampering can be installed on a computer system. The piece of software includes any suitable pieces of software, such as system software (an operating system), application software, and network software. The product identifier dynamic-link library 200A belongs to a class of executable routines stored separately from files. These routines have particular extensions, such as "DLL," and are loaded only when needed by a program. These dynamic-link libraries can suitably be found as a feature of the Microsoft Windows family of operating systems and OS/2. A dynamic-link library has several characteristics: first, it typically does not consume any memory until it is used; second, because a dynamic-link library is a separate file, a programmer can make corrections or improvements to only that module without affecting the operating of the calling program, or any other dynamic-link library; and finally, a programmer can use the same dynamic-link library with other programs.

The setup information file 200C belongs to a class of files that is textually based and contains information used by a setup application, such as the setup software 200B, during an installation. Typically, the setup information file 200C, among other setup information files (such as a protection information file 202A), is created before the authoring of a setup application, such as the setup software 200B. Examples of information that may be stored in an information file includes registry changes, file names, and locations of the source files on source media. The setup information file 200C, as well as the protection information file 202A, can also contain private sections. These private sections depend on the setup software 200B and can be used to store specialized information used by a specific setup application, such as the setup software 200B, for installing pieces of software that inhibit software tampering.

The setup software 200B is a program whose function is to install another program, such as system software, application software, or network software, either on a storage medium or in memory. The setup software 200B might be used to guide a user through the often complex process of setting up an application for a particular combination of machine, printer, monitor, and network. The product identifier dynamic-link library 200A creates a unique product identifier and stores the created product identifier 204A in a registry 204, which is discussed hereinbelow. The setup information file 200C prepares an installation dynamic-link library 202B for the installation of a piece of software that inhibits software tampering. An installation component 202 comprises a protection information file 202A and the installation dynamic-link library 202B. The protection information file 202A contains various pieces of information, such as registry changes, file names, and locations of the source files for the installation of pieces of software that inhibit software tampering. Additionally, the protection information file 202A includes information for the installation of a system file 206B and various software components that are particular to a marketed software package.

Contained within a software component 202, the installation dynamic-link library 202B installs the actual piece of software that inhibits software tampering, such as the protection dynamic-link library 206A, that is specific to a particular market segment and may provide content or language appropriate for that particular market segment. The installation dynamic-link library 202B also sets an activation key 204C so as to allow the piece of software that inhibits tampering as embodied in the protection dynamic-link library 206A to quickly identify that the installation is a secured installation. Moreover, the installation dynamic-link library 202B also installs a number of encrypted protection profiles that contain information pertaining to the hardware and/or language, among other things, and various system files 206B so as to allow it to determine whether something has been tampered with.

The runtime component 206 comprises the protection dynamic-link library 206A, which embodies a piece of software that inhibits software tampering with system files 206B, which include help files, and market-specific content files, such as language.

A central hierarchical database 204 includes the product identifier 204A, the activation key 204C, and the encrypted protection profiles 204D. The central hierarchical database 204 is used to store information necessary to configure the systems for one or more users, applications, and hardware devices. The central hierarchical database 204 contains information that an operating system continually references during operation, such as profiles for each user, the applications installed on the computer, and types of documents each can create; property sheet settings for folders and application icons; what hardware exists on the system; and which ports are being used. The central hierarchical database 204, in addition, can be used, as mentioned above, to store pieces of information that aid in the inhibition of software tampering. One suitable piece of information includes checksums, which are calculated values that are used to test data for tampering, such as when a hacker modifies a file. The checksum is preferably calculated for a given chunk of data by sequentially combining all the bytes of data with a series of arithmetic or logical operations. During the time period in which software tampering is verified or validated, a new checksum can be calculated in the same way using the stored data. If the two checksums do not match, software tampering may have occurred, and suitable steps can be taken to correct the tampering or shut down the computing machine.

Figure 3A:
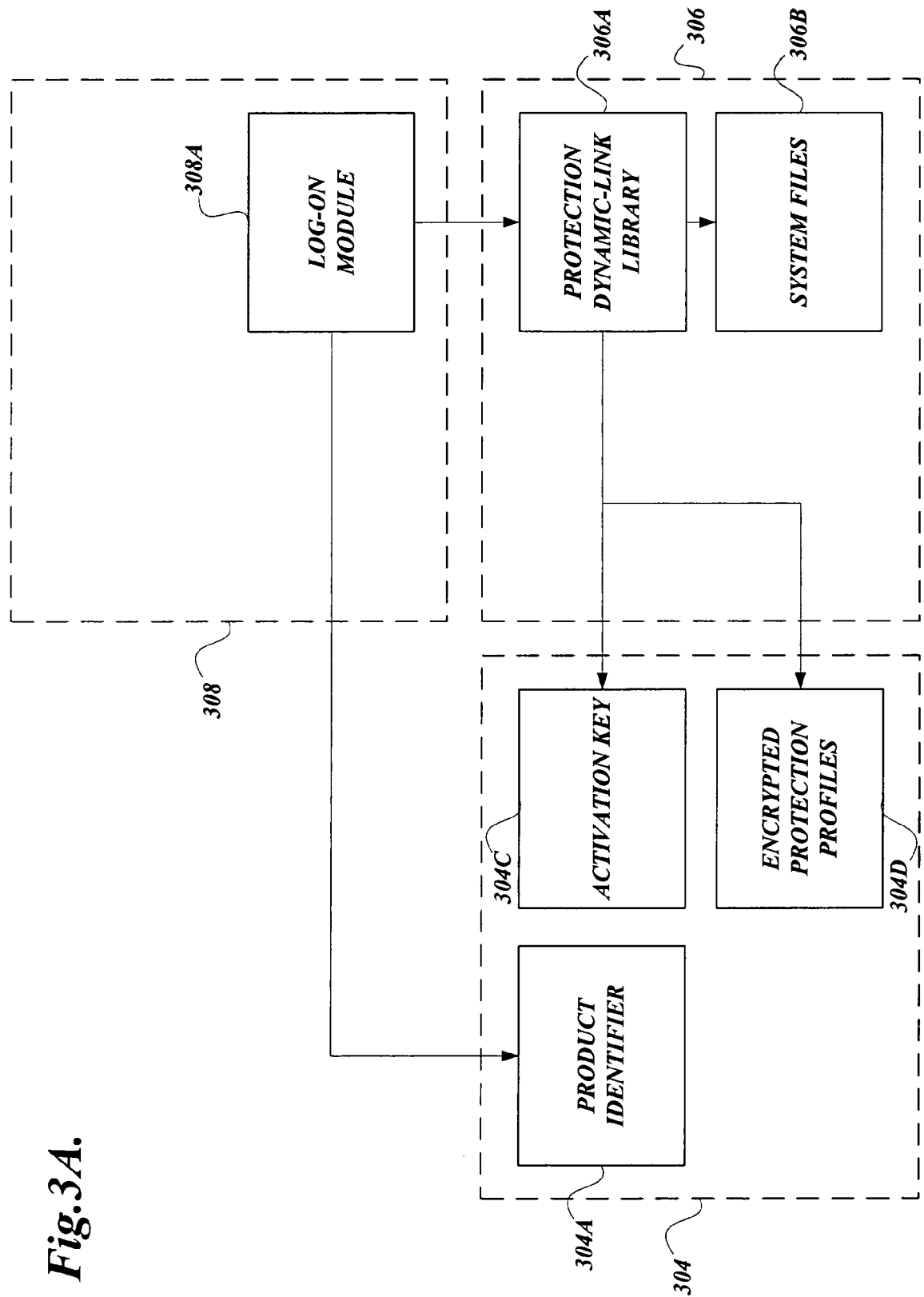
FIG. 3A is a block diagram illustrating exemplary software components that interoperate to inhibit software tampering.

FIG. 3A illustrates the execution of a piece of software for inhibiting software tampering as embodied by the protection dynamic-link library 306A. Various elements of FIG. 3A are similar to various elements of FIG. 2A, and for brevity purposes they will not be further discussed. A log-on component 308 comprises a log-on module 308A, and at the initiation of a computer system, the log-on module 380A attempts to load the protection dynamic-link library 306A depending on the product identifier 304A. If the appropriate product identifier exists in the central hierarchical database 304, the protection dynamic-link library 306A will be loaded by the log-on module 308A. The log-on module 308A is preferably a piece of software that receives the user name and password and validates the information before allowing the user to access the system software on the computing machine.

The protection dynamic-link library 306A, during the execution of the software of the computer system, verifies that various system files 306B have not been tampered with by reading various encrypted protection profiles 304D. In addition, the protection dynamic-link library 306A verifies various settings of keys and their associated values to determine whether they have been tampered with. The protection dynamic-link library 306A initially creates timers to check the registry as well as services that are authorized to run on the computer system. If the system has been tampered with, the protection dynamic-link library 306A preferably attempts to fix the tampering or initiates shutdown of the computing machine, among other suitable methods of dealing with tampering.

For example, the protection dynamic-link library 306A monitors the central hierarchical database 304 and resets keys and their associated values if there has been tampering. The protection dynamic-link library 306A also checks critical files, such as various system files 306B, against the information contained in the encrypted protection profiles 304D and the protection dynamic-link library 306A to determine whether there has been tampering. Moreover, the protection dynamic-link library 306A checks to make sure that software services running on the computer systems are authorized and removes unauthorized software services.

FIG. 3B illustrates the encrypted protection profiles 304D, accessible by pieces of software, such as the log-on module 308A. The log-on module 308A communicates with the protection dynamic-link library 306B to access the encrypted protection profiles 304D. The interoperability between the log-on module 308A and the protection dynamic-link library 306B is preferably by a suitable protocol acknowledging that communication or the transfer of information can safely take place between pieces of software.

One suitable protocol includes the transmission of a random salt value, which can comprise a string of numeric, alphabetic, or alphanumeric information, sent by the log-on module 308A to the protection dynamic-link library 306B. The protection dynamic-link library 306B preferably has two keys, a public library key and a private library key. In encryption and digital signatures, these keys comprise a string of bits used for encrypting and decrypting information to be transmitted or received. Encryption commonly relies on two different types of keys, a public key known to more than one person, and a private key known only to one person.

The protection dynamic-link library 306B uses the private library key to decrypt a profile, such as profiles 312-316. Each profile is suitably organized as a data structure, known as a blob, which is an amorphous data structure in which various pieces of information can be stored. Preferably, blobs of profiles 312-316 are encrypted using the private library key of the protection dynamic-link library 306B. The profile 312 includes a blob 1, which has been encrypted by the private library key of the protection dynamic-link library 306B. The blob 1 includes profile data 1 312A, whose size and format depend on a profile type, such as a hardware profile or a language profile. Blob 1 also includes a signature 1 312B, which contains a checksum of the profile data 1 312A, digitally signed with the public library key of the protection dynamic-link library 306B. Blob 1 also includes a verify blob 1 312C, which is a checksum of the identifier of the profile 312 and the profile data 1 312A, digitally signed with a public calling key of the log-on module 308A and also encrypted with a private calling key of the log-on module 308A.

The profile 314 is organized as a blob 2 within which is contained a verifier blob 2 314A, which is a checksum of an identifier of the profile 314 and its data described by the profile data 2 314B, digitally signed with the private calling key of the log-on module 308A and also encrypted with a private calling key of the log-on module 308A. The blob 2 includes the profile data 2 314B, whose size and format depend on a profile type, such as a hardware profile or a language profile. The blob 2 also includes a signature 2 314C, which is a checksum of the profile data 2 314B, digitally signed with the public library key of the protection dynamic-link library 306B.

The profile 316 is organized as a blob 3. The blob 3 includes a signature 3 316A, which is a checksum of a profile data 3 316C, digitally signed with the public library key of the protection dynamic-link library 306B. The blob 3 includes a verifier blob 3 316B, which is a checksum of an identifier of the profile 316 and its profile data 3 316C, digitally signed with the public calling key of the log-on module 308A and also encrypted with the private calling key of the log-on module 308A. The blob 3 includes the profile data 3 316C, whose size and format depend on a profile type, such as a hardware profile or a language profile. Note that for each blobs 1-3 of profiles 312-316, various named organizations, such as profile data 1-3, signatures 1-3, and verifier blobs 1-3, are placed differently in each of blobs 1-3 or profiles 312-316. These differing arrangements aid in the inhibition of the tampering of profile data contained within the registry 304. Headers containing placement information exist within the blobs 1-3 allowing a determination where each of the named organizations reside within the blobs 1-3.

When the protection dynamic-link library 306B has found the desired profile by decrypting the profile or the blob using its private library key, it will return the profile to the log-on module 308A. Prior to returning the data to the log-on module 308A, the protection dynamic-link library 306B computes a checksum from the identifier and the profile data of the found profile. The checksum includes the result of comparing the profile and the random salt value that was originally transmitted by the log-on module 308A. The salt value in essence inhibits the ability of a hacker from simply emulating the protection dynamic-link library 306A to return a false profile to the log-on module 308A.

When the computation of the checksum has occurred, the protection dynamic-link library 306B returns to the log-on module 308A a result which is essentially a result data structure with various pieces of information (e.g., success, failure, and flags detailing the success or failure), a verifier blob in the found profile, and the calculated checksum computed from the identifier of the profile, its data, the result, and the random salt value. The log-on module 308A verifies the returned result from the protection dynamic-link library 306B. The log-on module 308A decrypts the verifier blob using its private calling key to obtain the checksum of the identifier of the profile and the data of the profile. In addition, the log-on module 308A verifies the signature of the verifier blob by using its public calling key. Moreover, the log-on module 308A computes a checksum from the decrypted verifier blob checksum, the results of the DLL, and the random salt value passed originally to the protection dynamic-link library 306A. The log-on module 308A performs a test to determine whether the checksum it has computed matches the checksum returned by the protection dynamic-link library 306B. If the checksums do not match, the log-on module 308A concludes that the system has been tampered with.

Figure 4A:
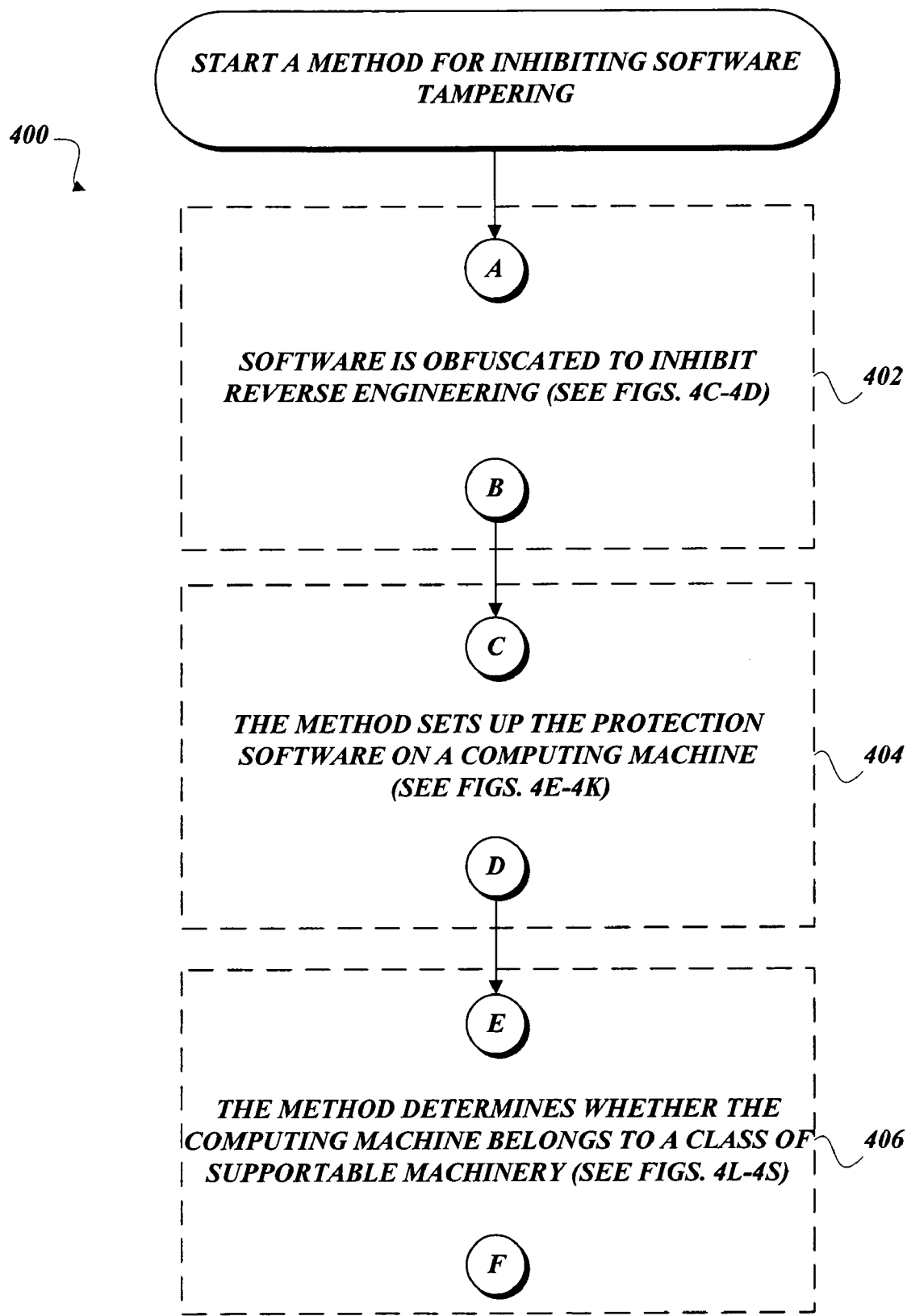
FIGS. 4A-4Z are process diagrams illustrating a method for inhibiting software tampering, according to one embodiment of the present invention.
Figure 4B:
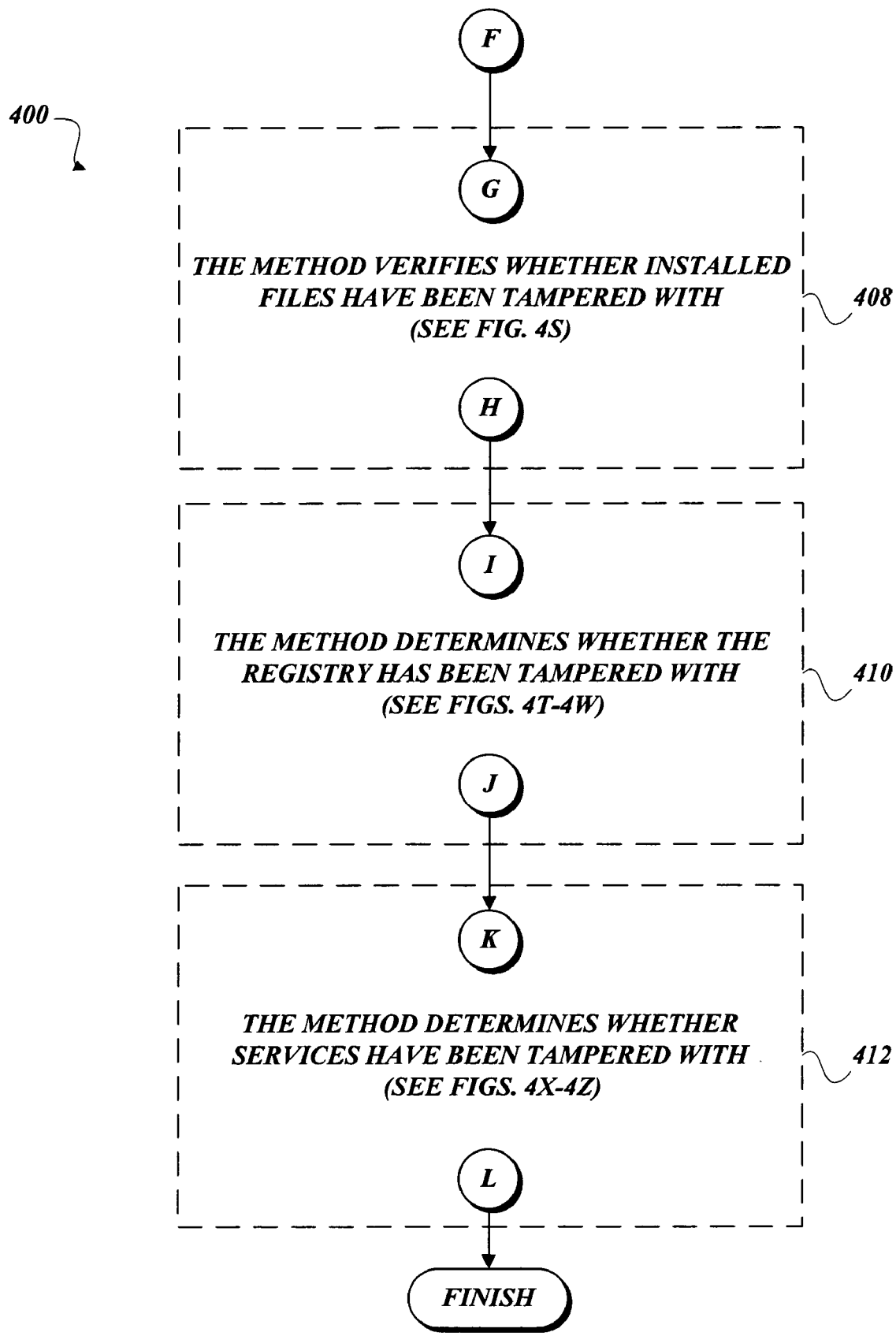
Figure 4C:
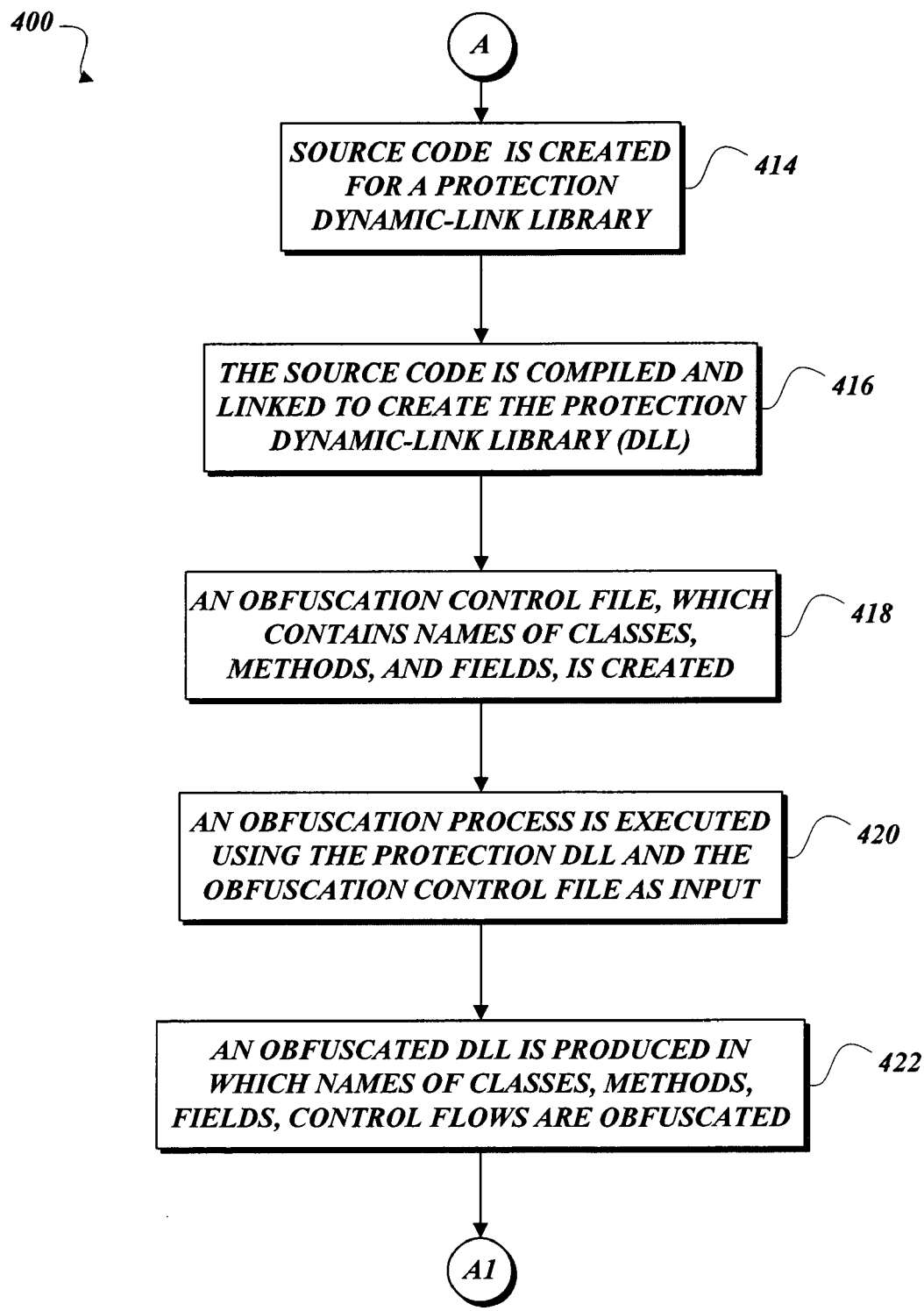
Figure 4D:
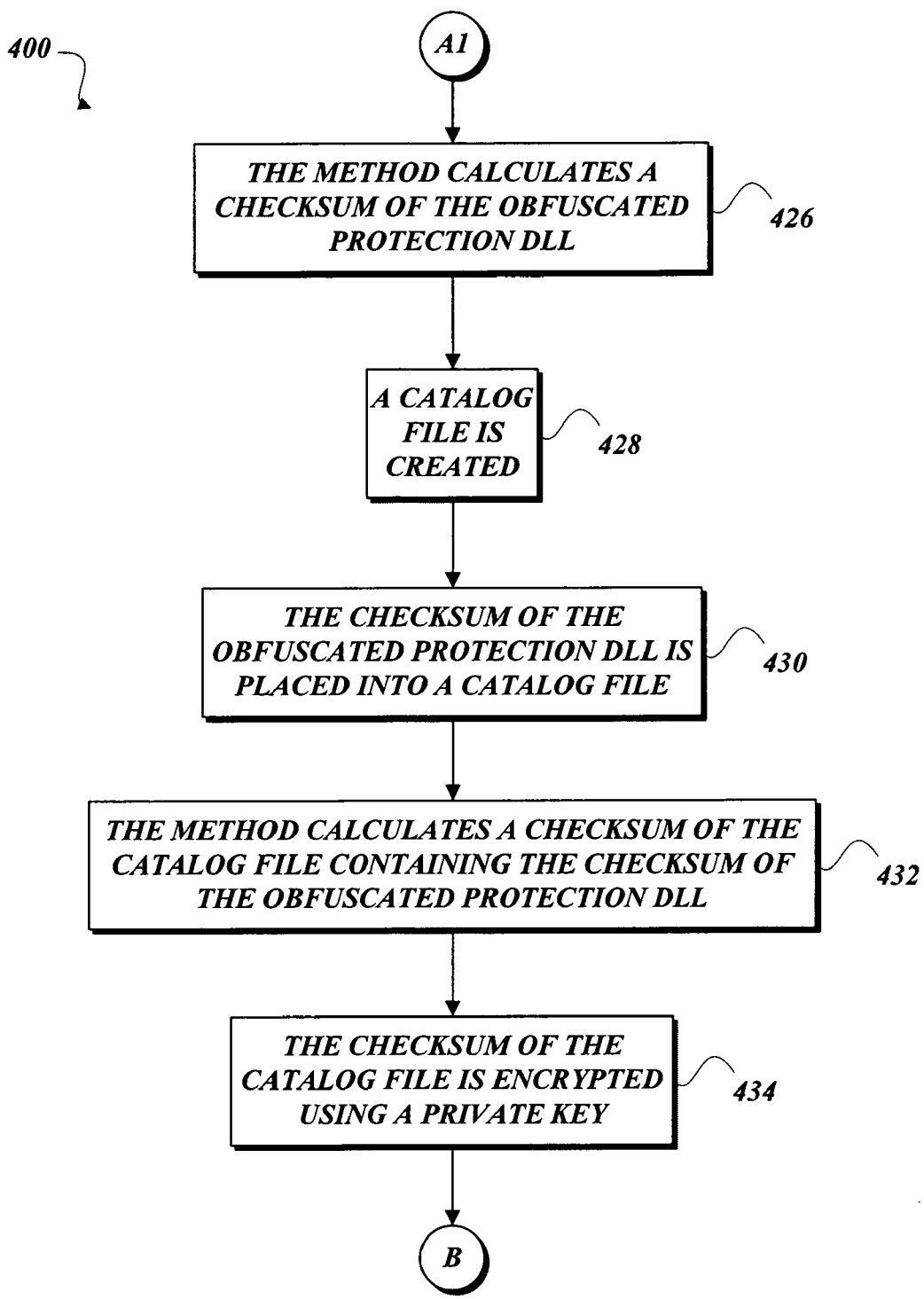
Figure 4E:
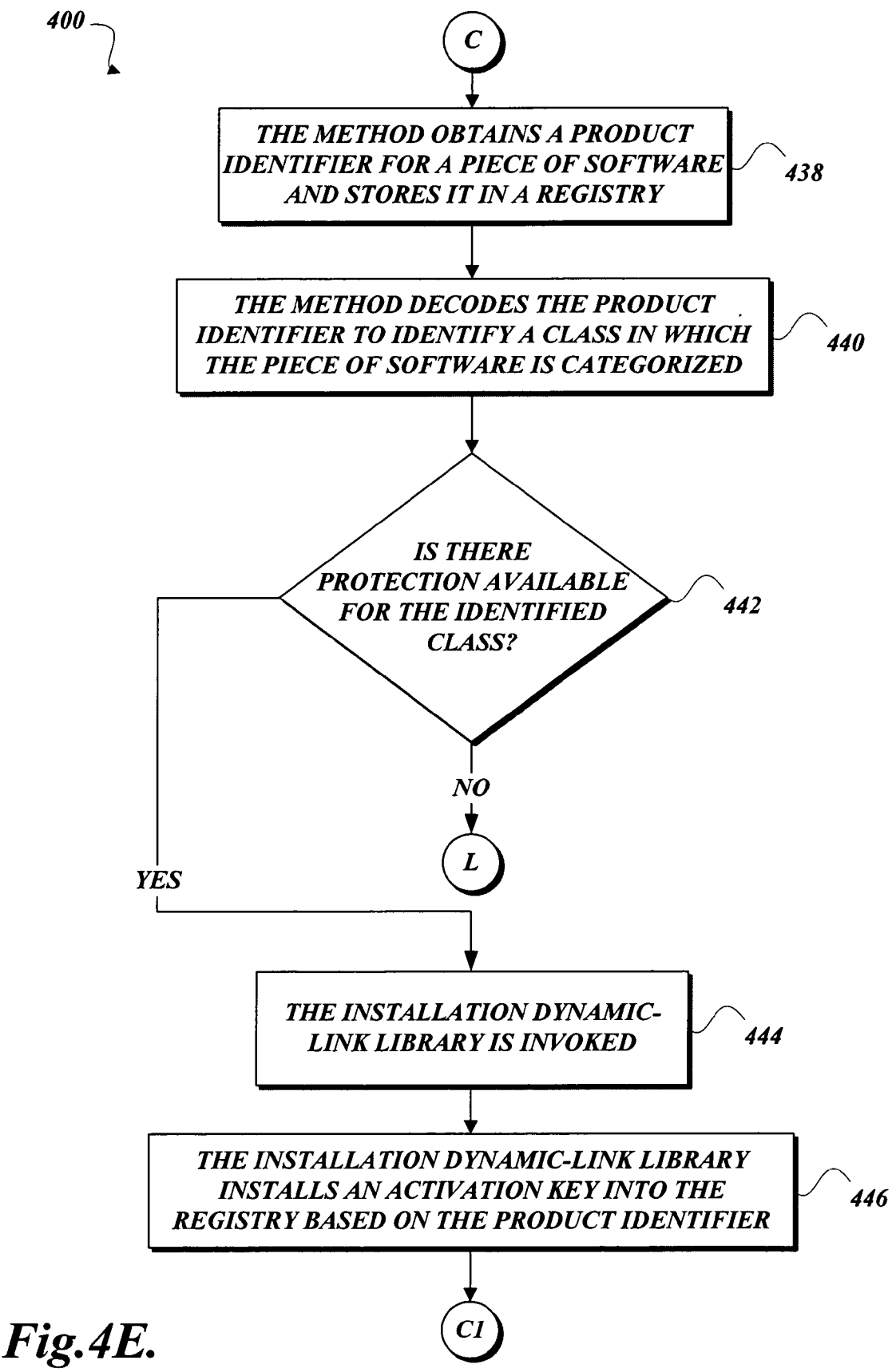
Figure 4F:
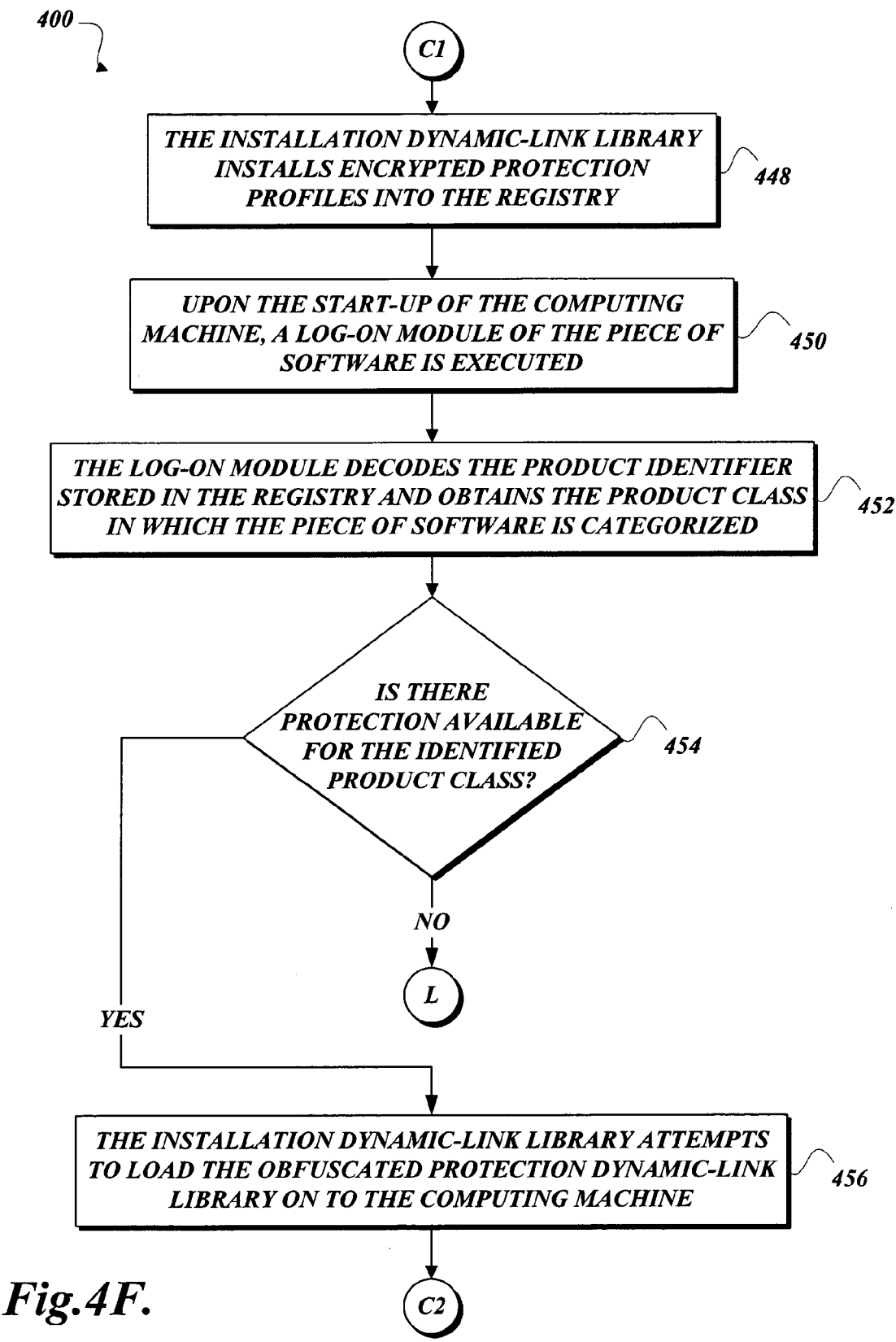
Figure 4G:
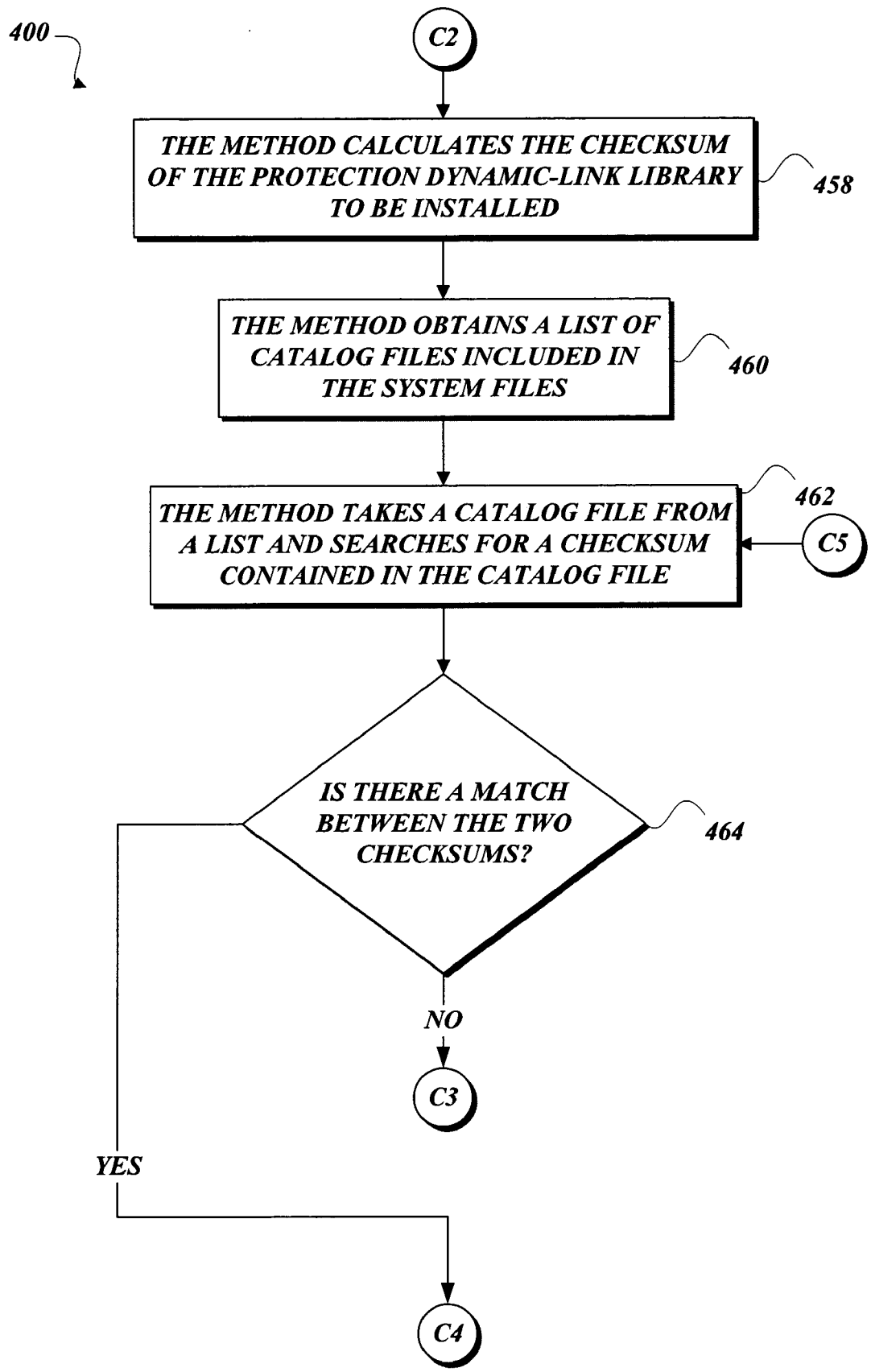
Figure 4H:
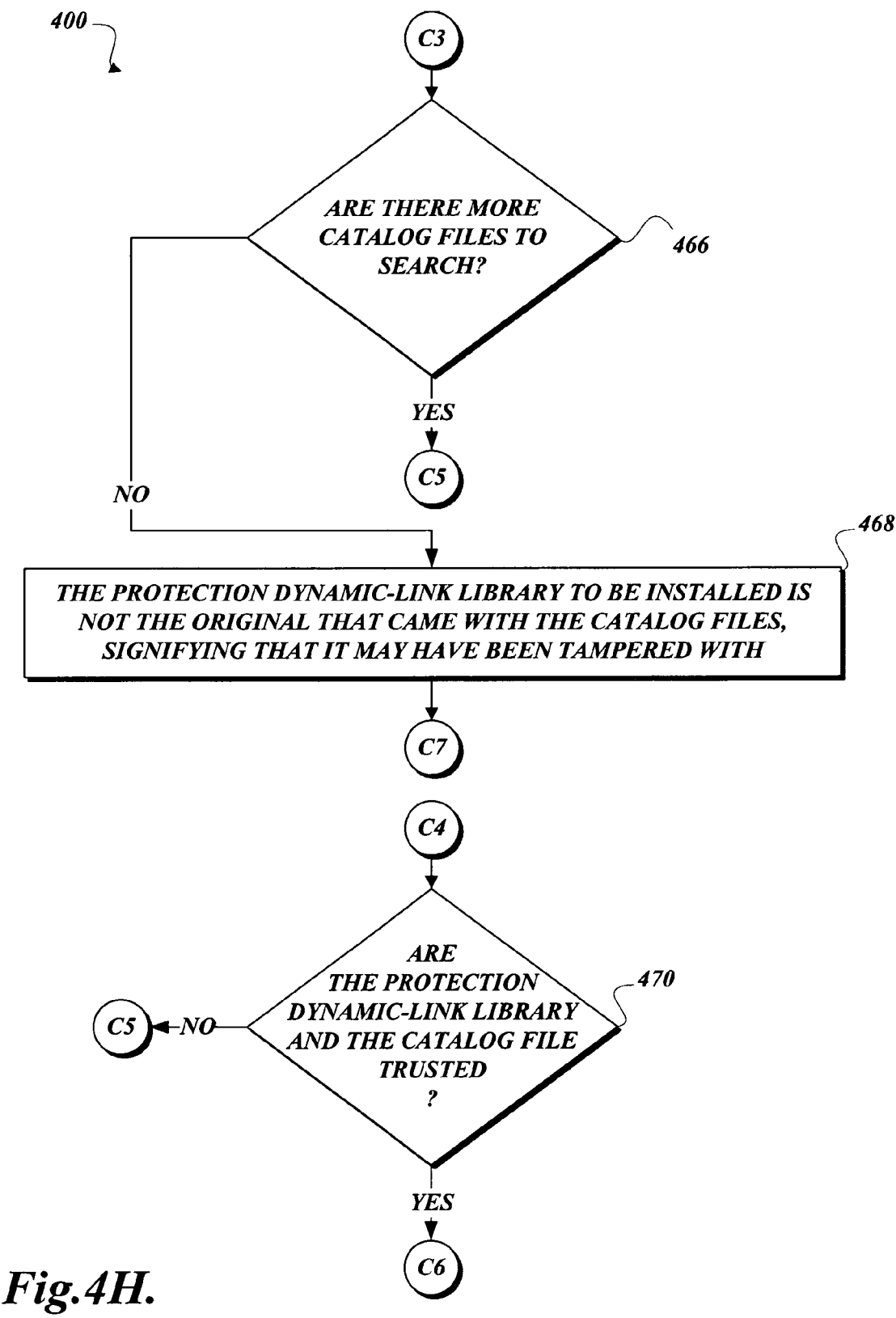
Figure 4I:
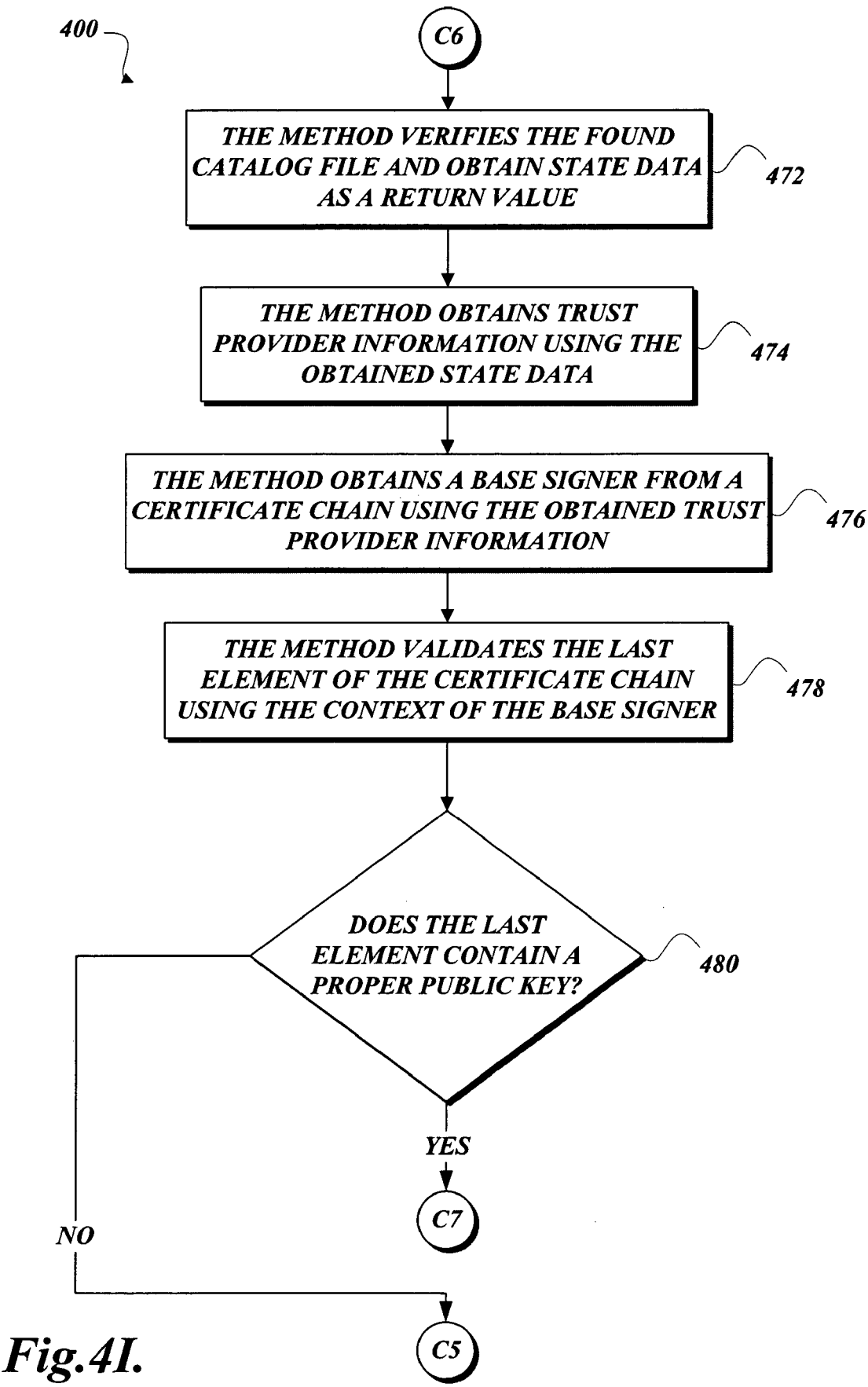
Figure 4J:
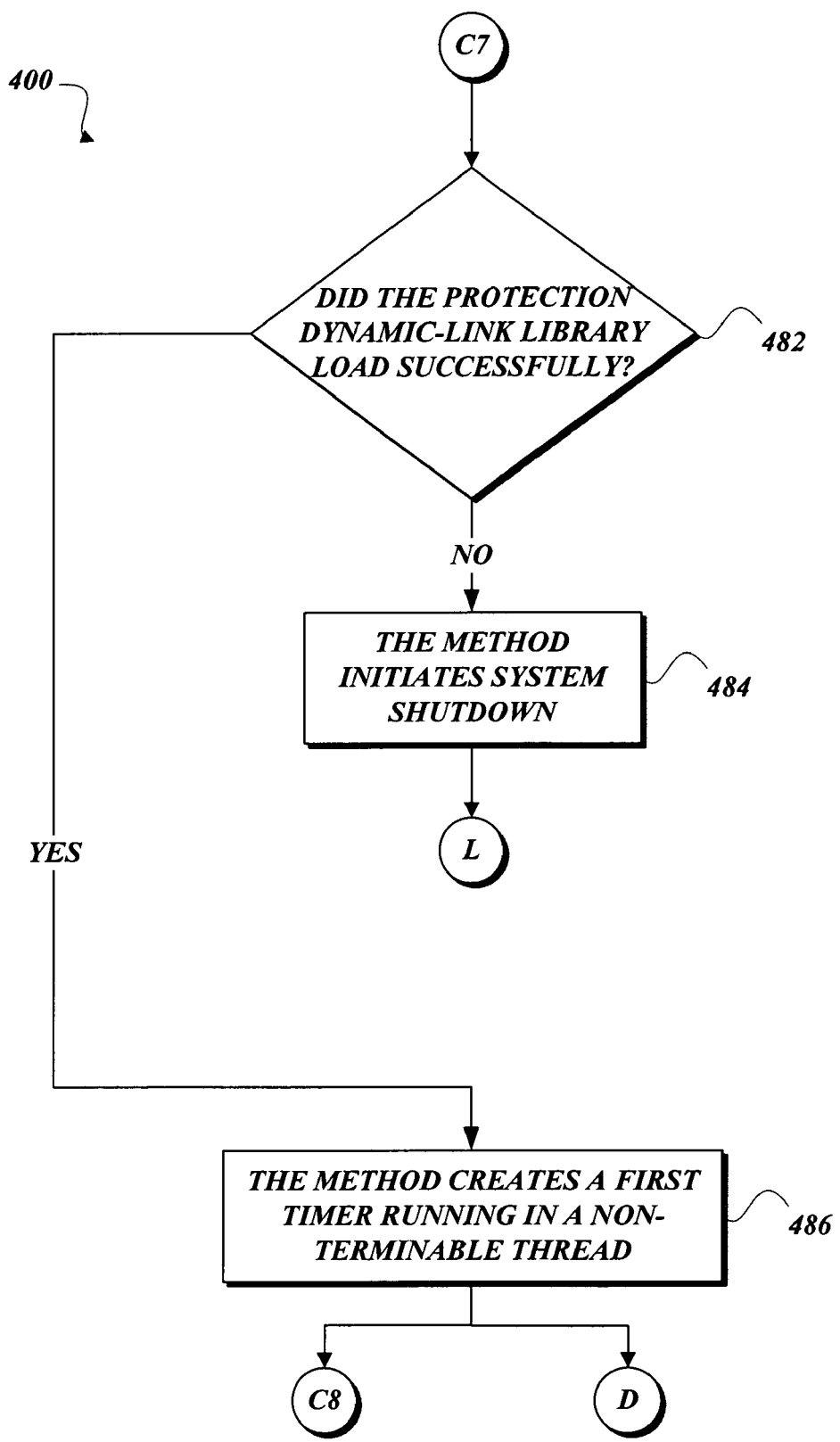
Figure 4K:
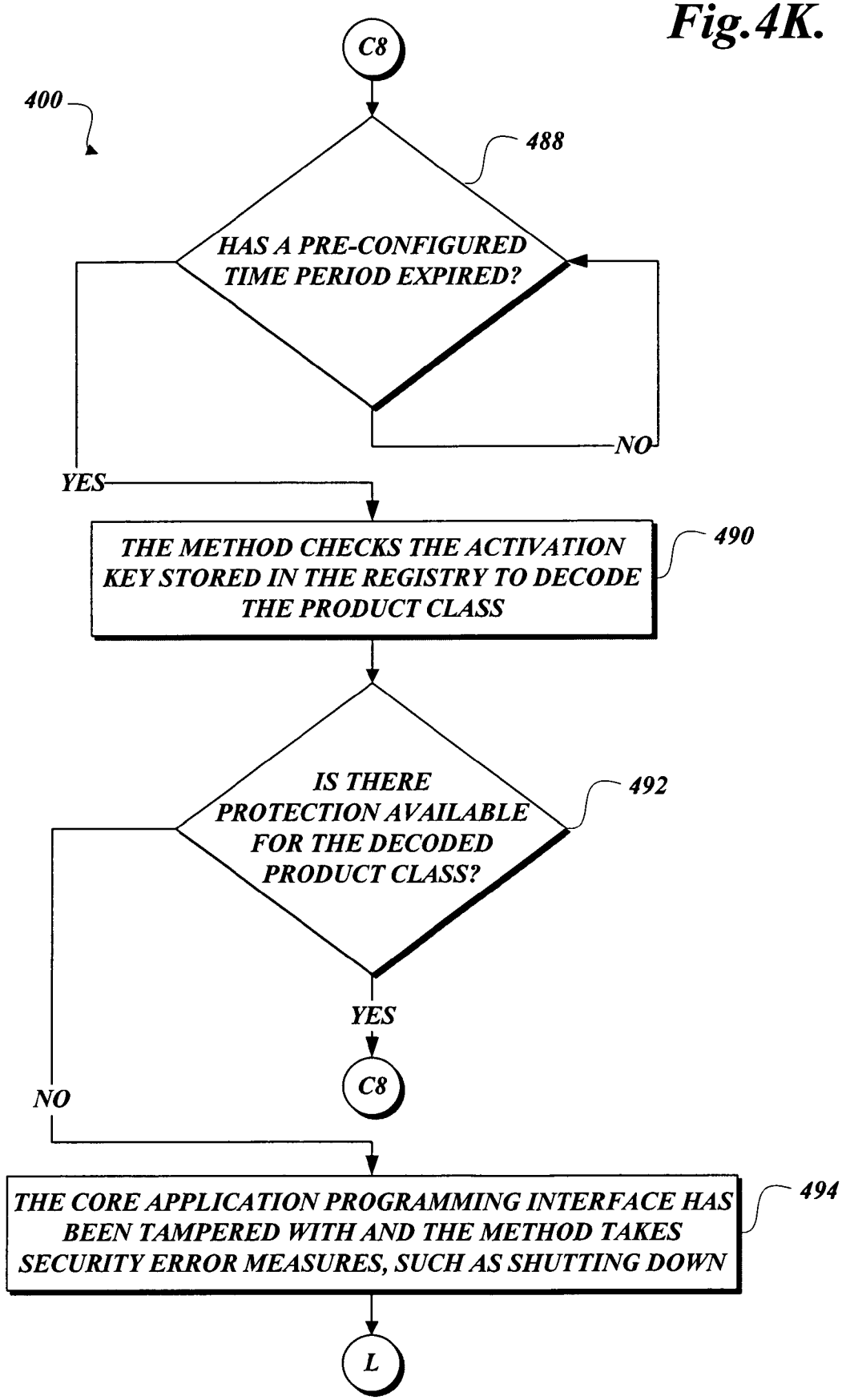
Figure 4M:
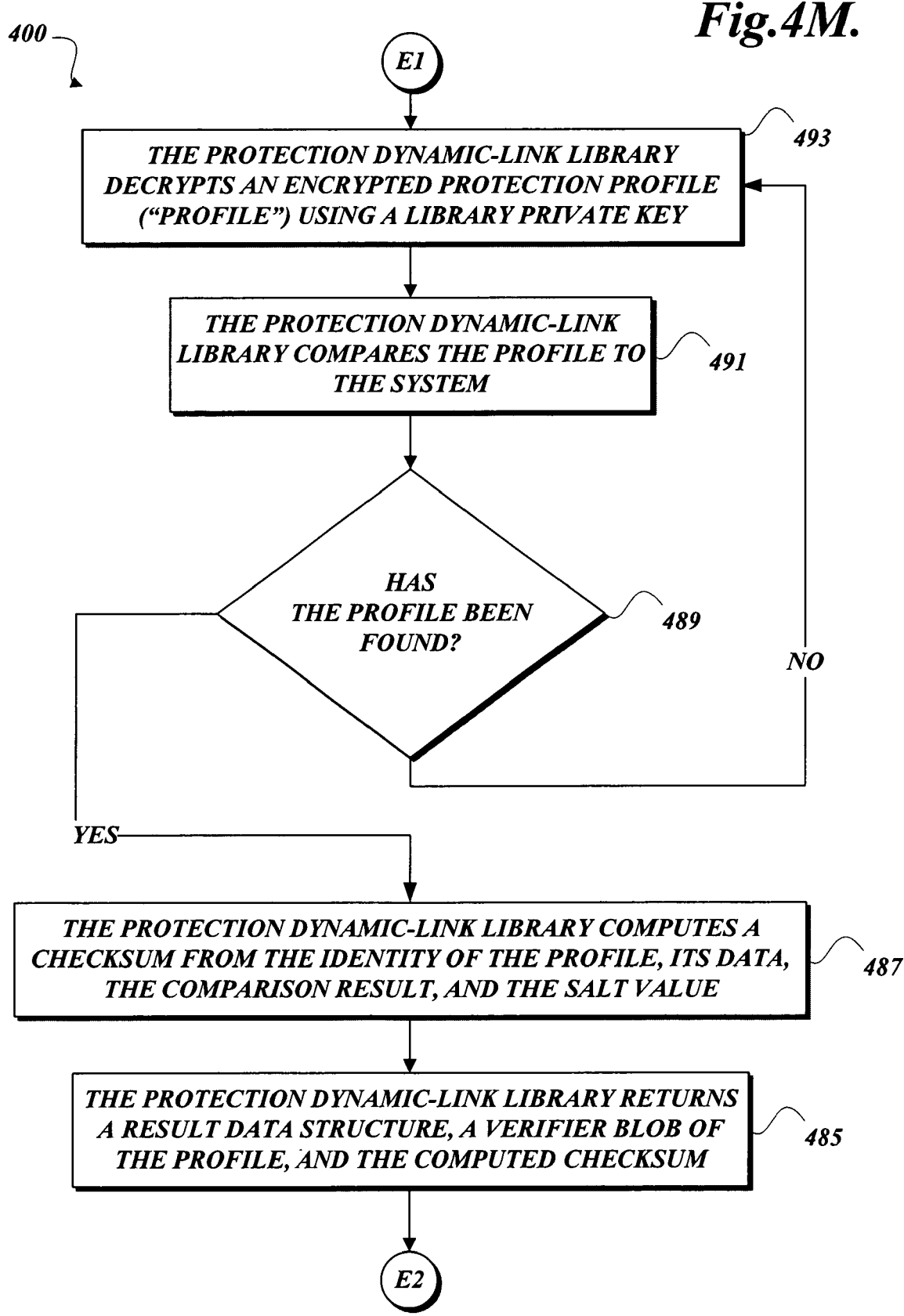
Figure 4N:
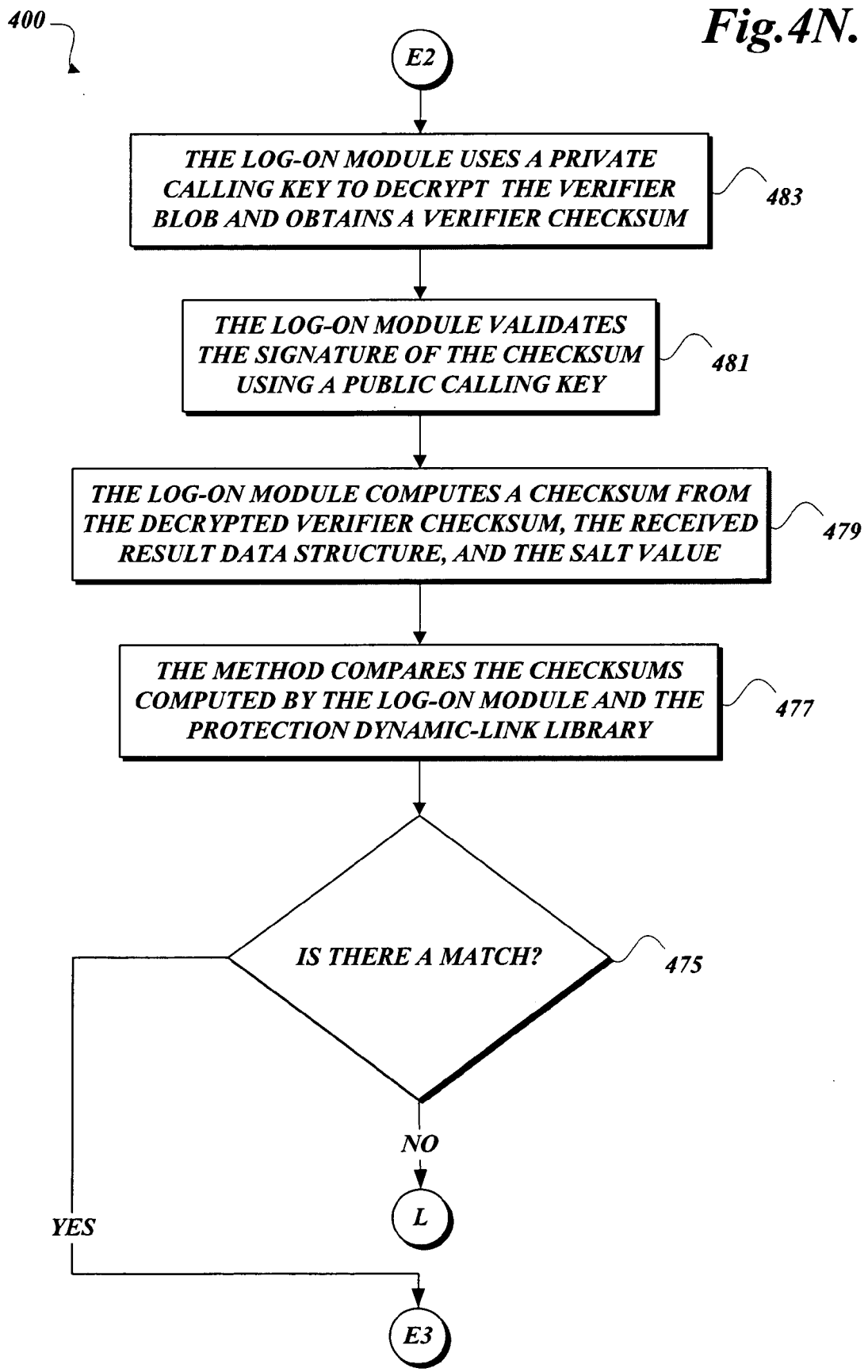
Figure 4O:
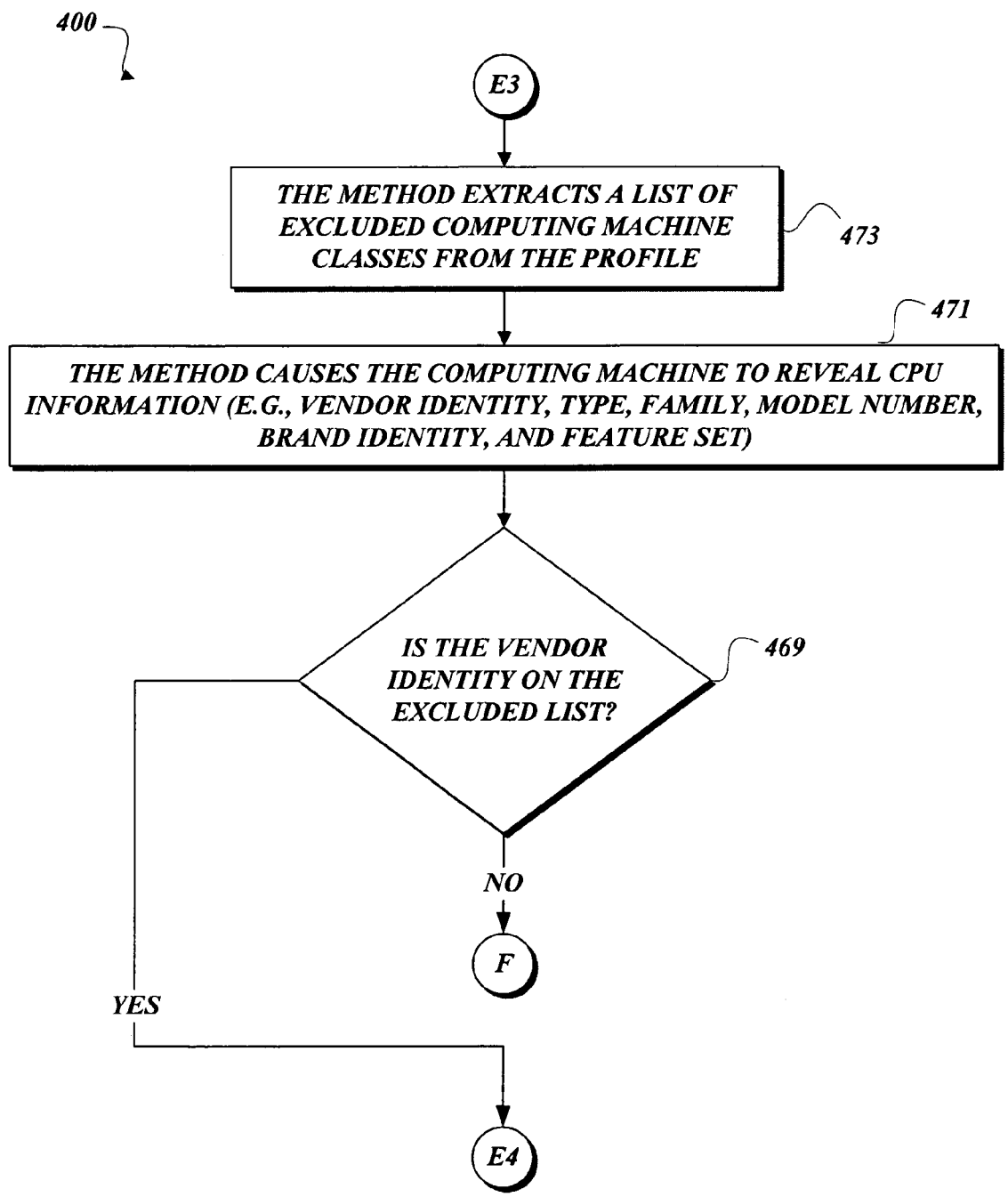
Figure 4P:
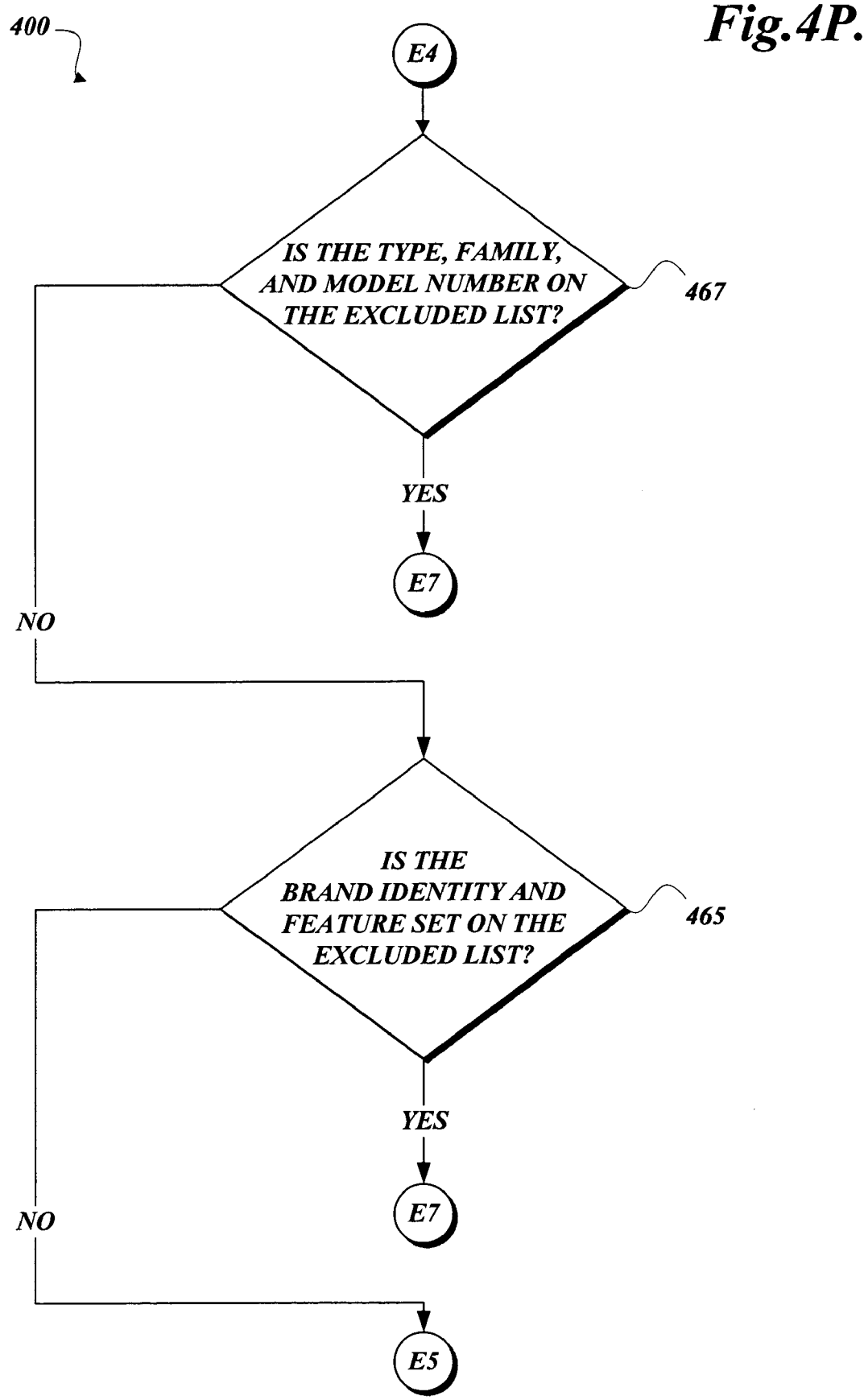
Figure 4Q:
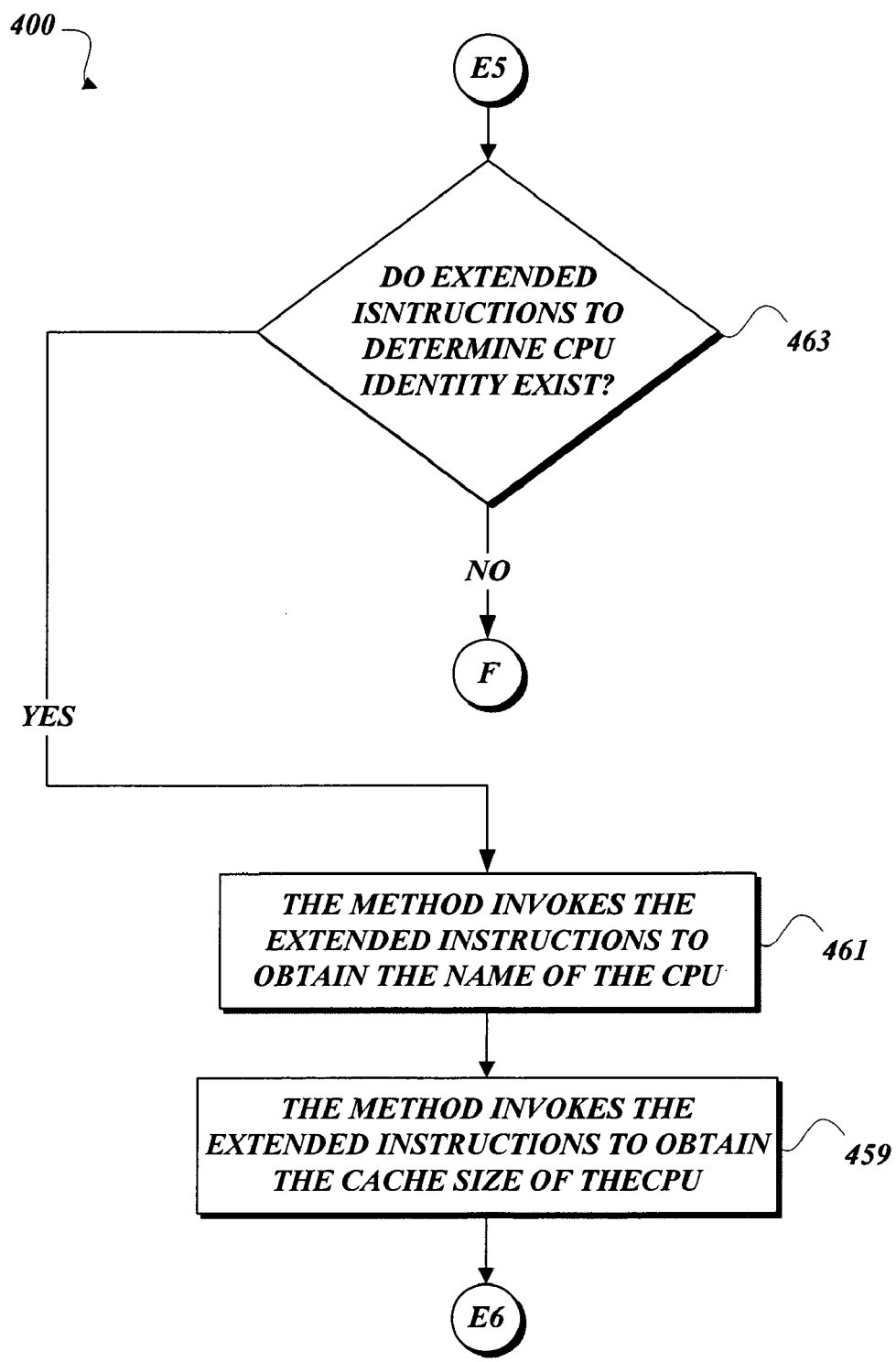
Figure 4R:
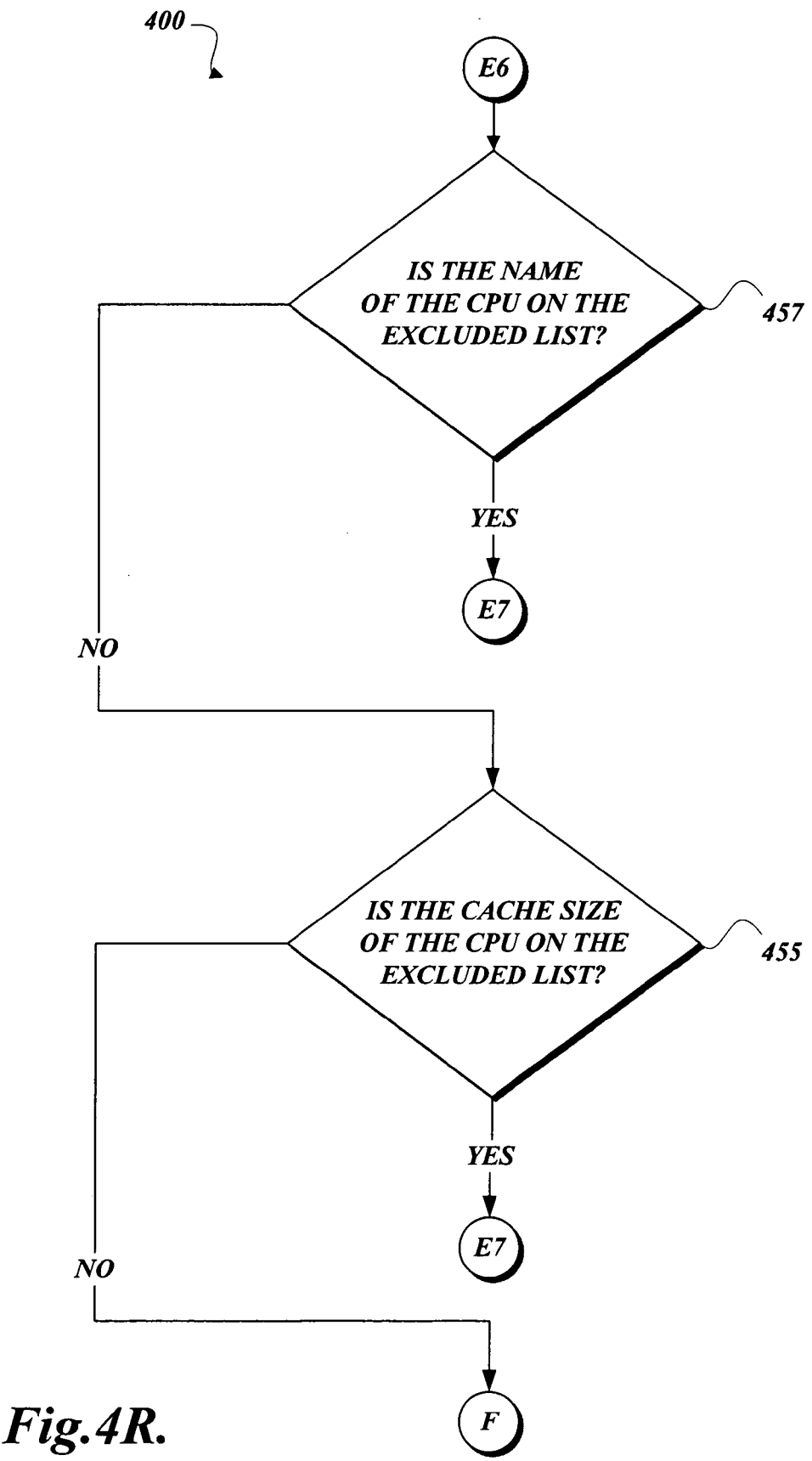
Figure 4S:
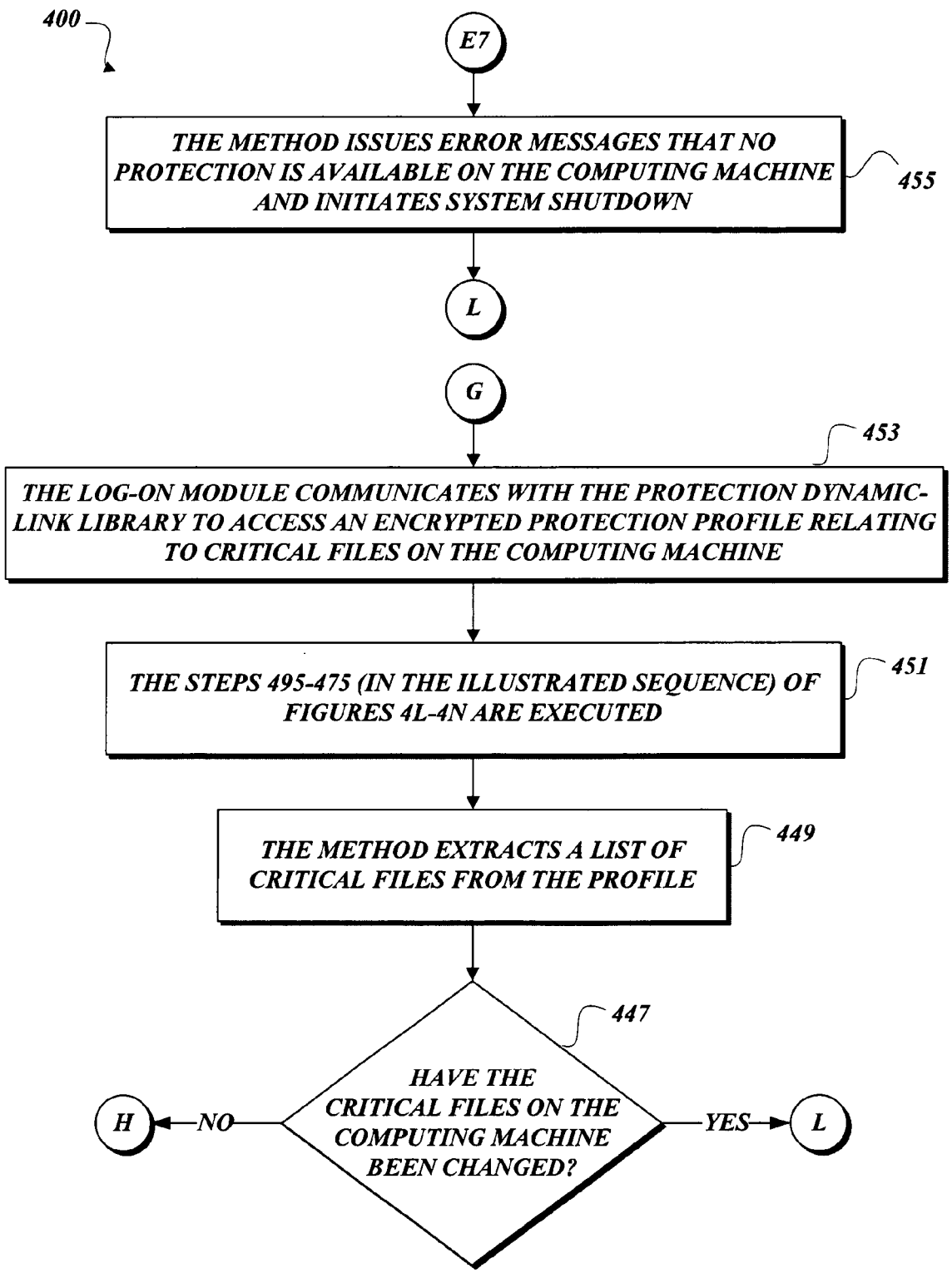
Figure 4U:
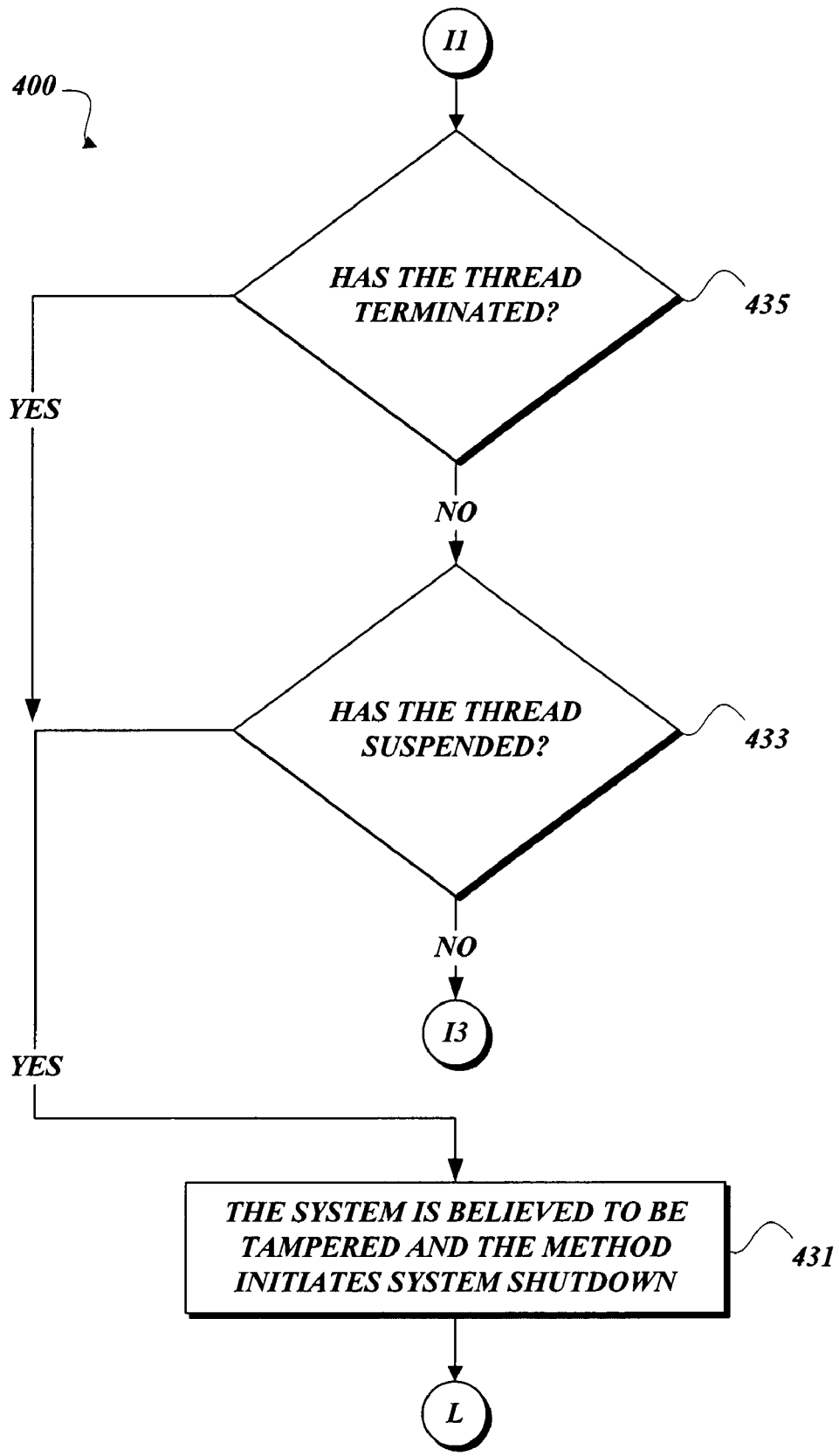
Figure 4V:
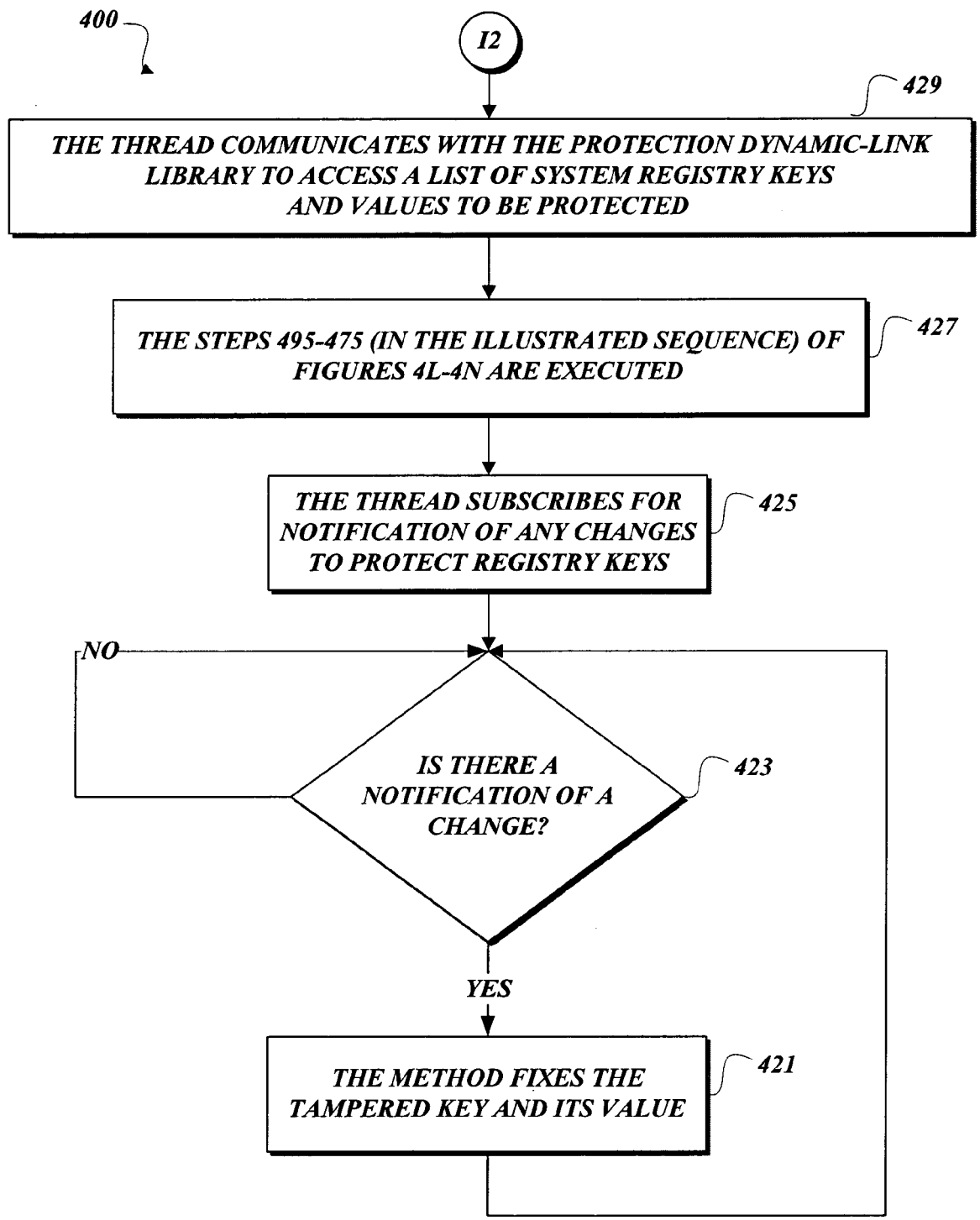
Figure 4W:
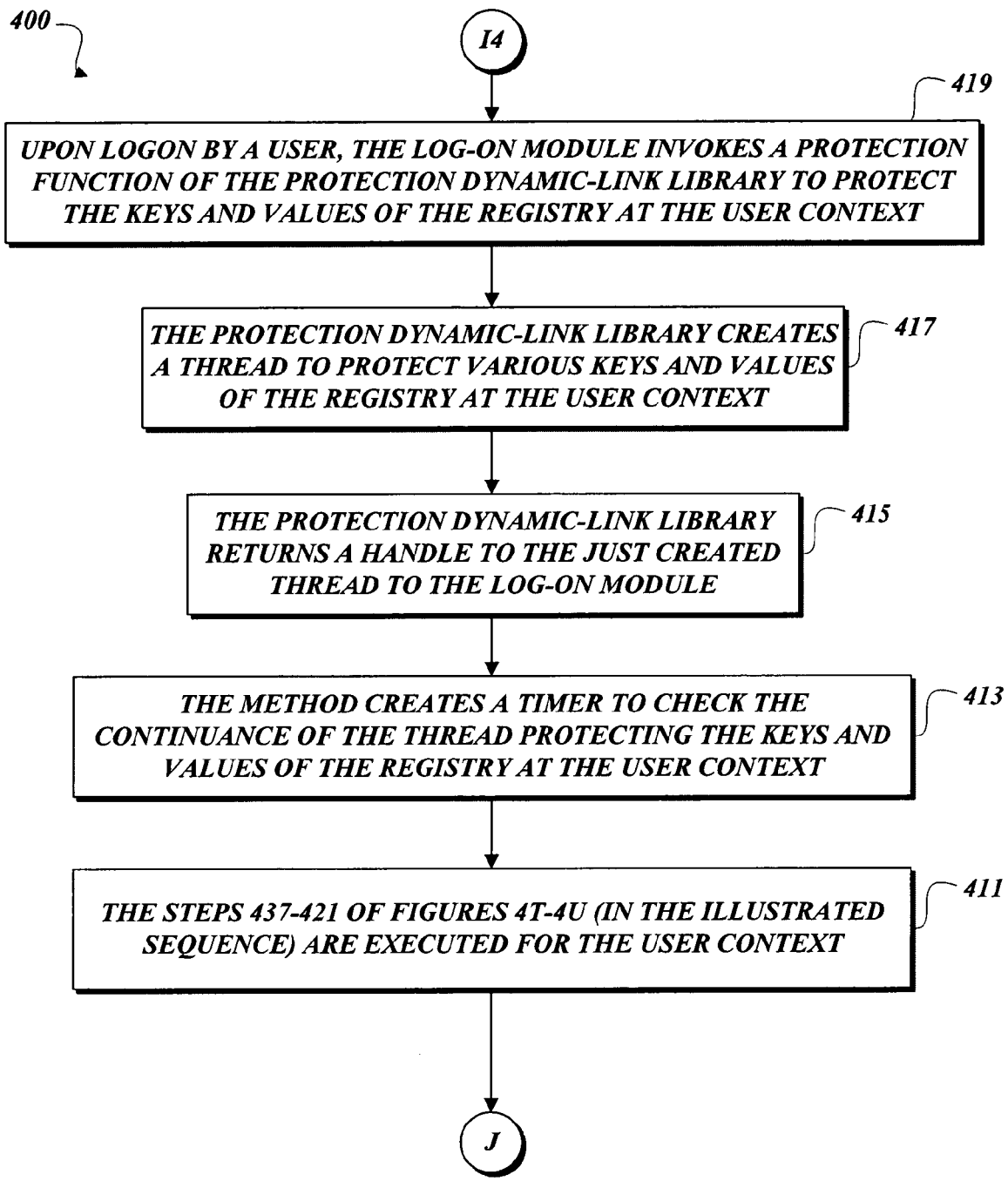
Figure 4X:
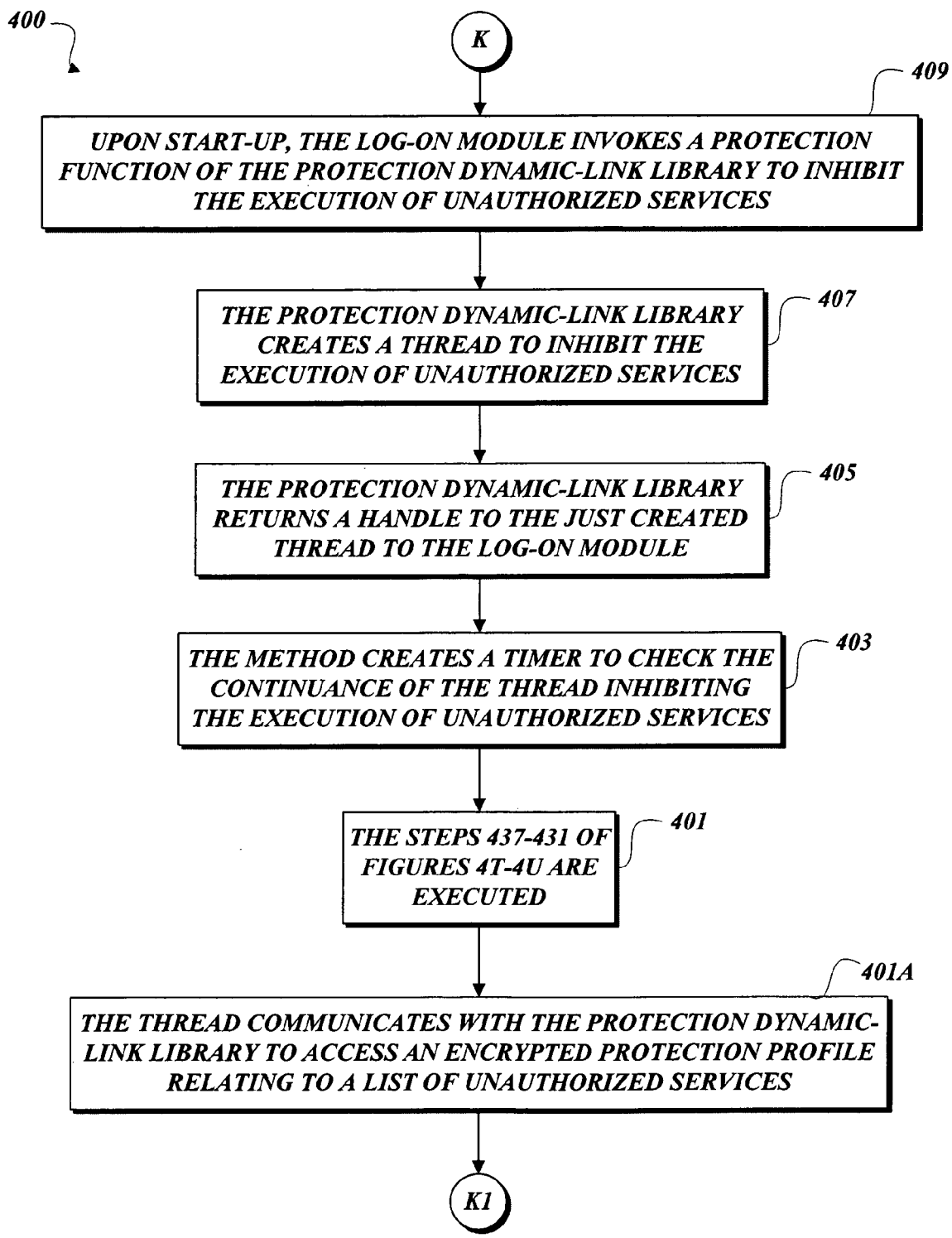
Figure 4Y:
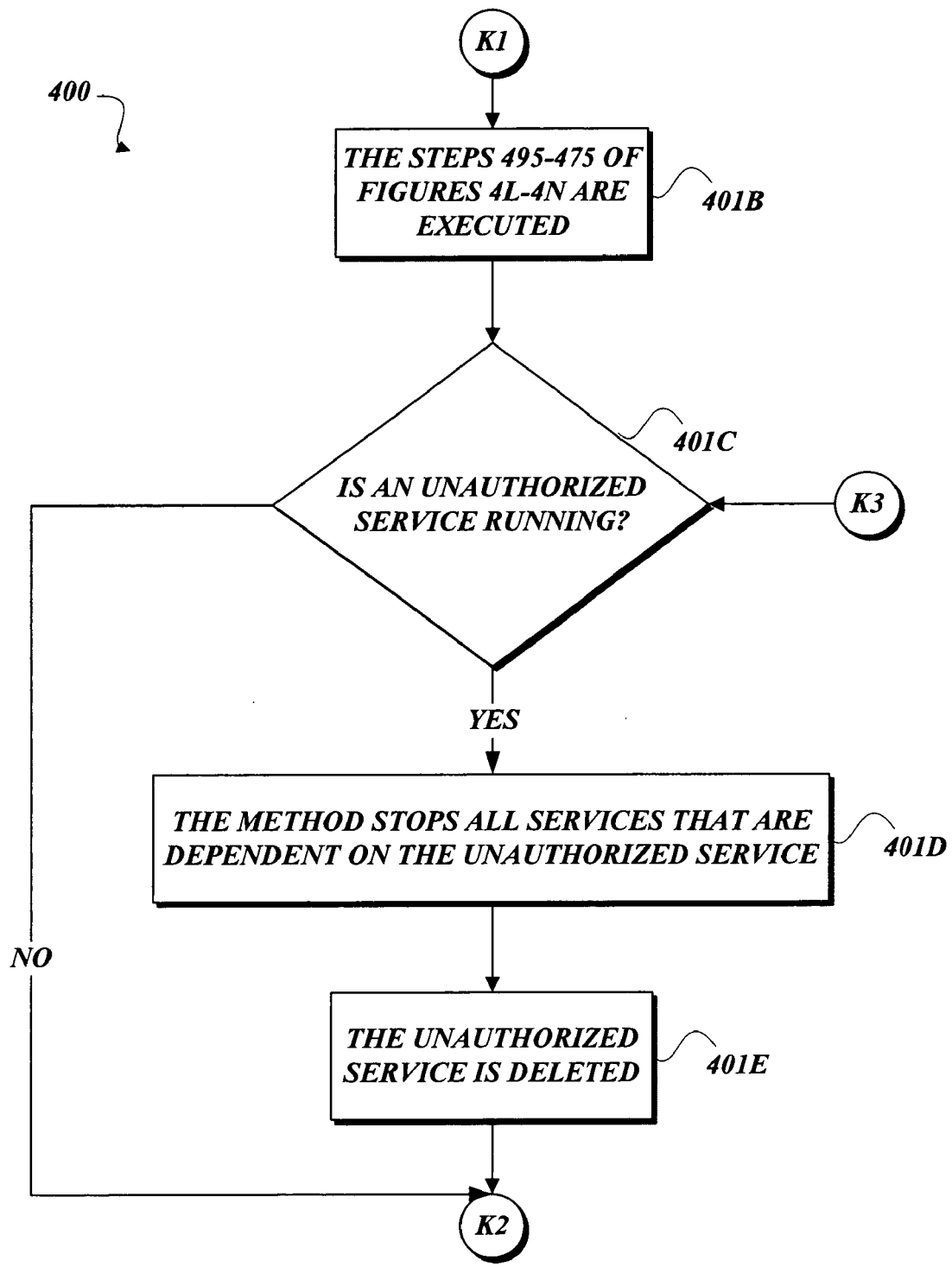
Figure 4Z:
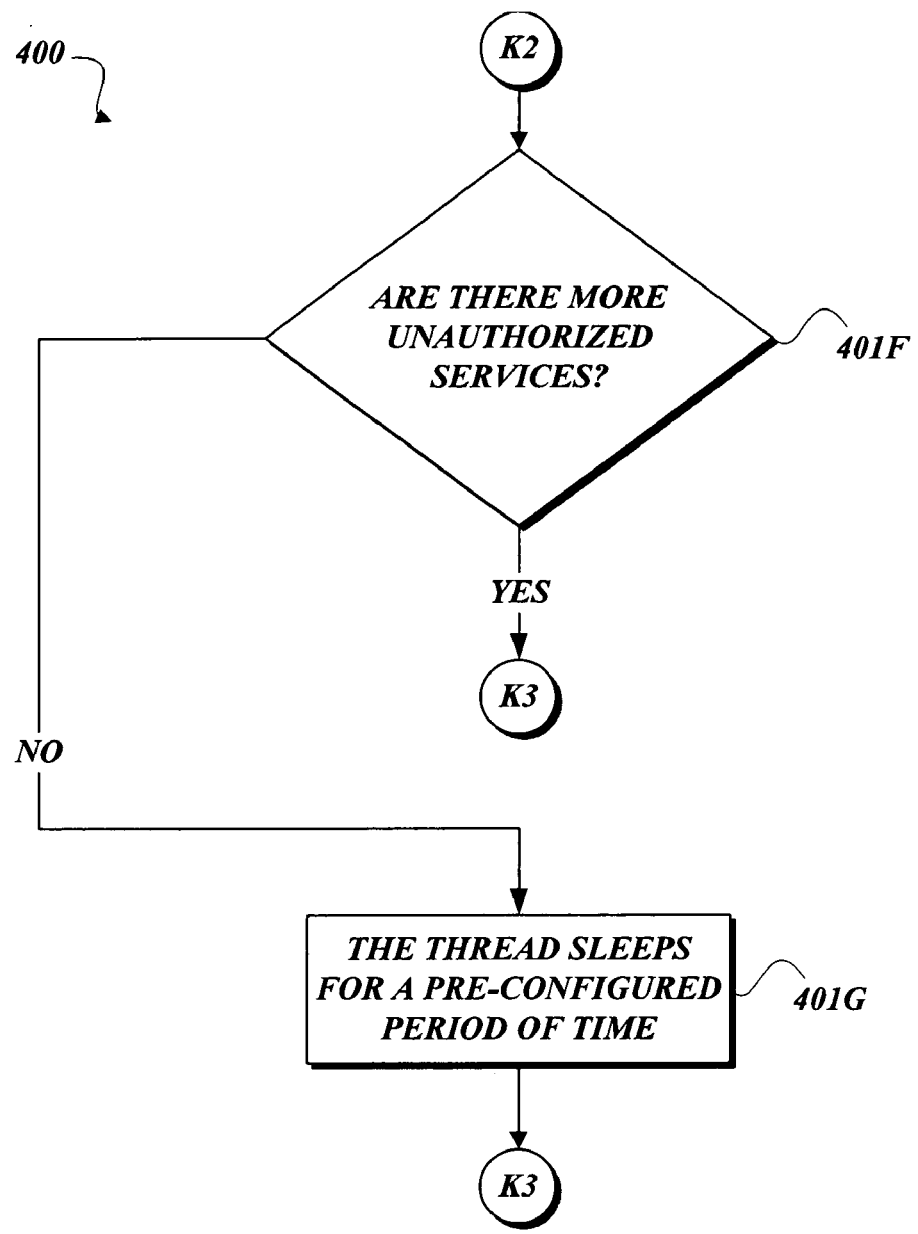

FIGS. 4A-4Z illustrate a method 400 for inhibiting software tampering. For clarity purposes, the following description of the method 400 makes references to various elements illustrated in connection with software components 200, 202, 204, and 206 of FIG. 2A; the log-on module 308A; and the protection dynamic-link library 306B of FIGS. 3A-3B. From a start block, the method 400 proceeds to a set of method steps 402, defined between a continuation terminal ("Terminal A") and an exit terminal ("Terminal B"). The set of method steps 402 describes the obfuscation of pieces of software for inhibiting software tampering.

From Terminal A (FIG. 4C), the method 400 proceeds to block 414 where source code is created for a protection dynamic-link library, which embodies pieces of software that inhibit software tampering. The source code is compiled and linked to create the protection dynamic-link library (DLL). See block 416. Next, at block 418, an obfuscation control file, which contains names of classes, methods, and fields, is created. The method 400 then proceeds to block 420 where an obfuscation process is executed using the protection DLL and the obfuscation control files as input. An obfuscated DLL is produced in which names of classes, methods, fields, and control flows are obfuscated. See block 422. The obfuscation process makes the protection dynamic-link library difficult to debug by a hacker who is attempting to reverse engineer the protection dynamic-link library. One example of obfuscation is the insertion of jump instructions into the protection dynamic-link library or the reordering of programming instructions.

The obfuscation process described above is one of many suitable techniques that provides for the renaming of symbols in the assembly of software so as to foil decompilers that attempt to reverse engineer software for illicit purposes. The obfuscation process can increase protection against illicit decompilation while leaving the application intact. The goal of obfuscation is confusion, which taxes the minds of hackers to comprehend multifaceted intellectual concepts of pieces of software. While the obfuscation process would not only confuse a human interpreter, who is a hacker, it would also likely break a decompiler, which depends on certainties of logic. An obfuscation process creates a myriad of decompilation possibilities, some of which lead to incorrect logic, hence causing uncertainties in translation.

From Terminal A1 (FIG. 4D), the method 400 proceeds to block 426 where the method calculates a checksum of the obfuscated protection DLL. A catalog file is then created. See block 428. One suitable implementation of the catalog file is a database. The catalog contains the name of each software component, its version, and its signature (e.g., checksums). Next, at block 430, the checksum of the obfuscated protection DLL is placed into the catalog file. The method 400 then proceeds to block 432 where the method calculates a checksum of the catalog file containing the checksum of the obfuscated protection DLL. The checksum of the catalog file is also encrypted using a private key. See block 434. In other words, the catalog file is digitally signed by the private key. At this point, the method 400 produces the obfuscated protection DLL and the catalog file that can be verified. Verification aids in ascertaining whether the obfuscated protection DLL is coming from a known source, such as a particular software manufacturer, and that the obfuscated protection DLL has not been tampered with. The method 400 then continues to the exit Terminal B.

From Terminal B (FIG. 4A), the method 400 proceeds to a set of method steps 404, defined between a continuation terminal ("Terminal C") and an exit terminal ("Terminal D"). The set of method steps 404 describes the setting up of the protection dynamic-link library, which embodies pieces of software for inhibiting software tampering, on a computing machine.

From Terminal C (FIG. 4E), the method 400 proceeds to block 438 where the method obtains a product identifier for a piece of software and stores it in a central hierarchical database, such as a registry. The product identifier is provided by a user, which he can obtain from a key typically affixed to the packaging of the piece of software. The method decodes the product identifier to identify a class in which the piece of software is categorized. See block 440. The piece of software can include any suitable pieces of software, such as system software, application software, or network software. Next, at decision block 442, a test is made to determine whether protection is available for the identified class. If the answer is NO, the method 400 proceeds to another continuation terminal ("Terminal L") and terminates execution. If, on the other hand, the answer to the test at decision block 442 is YES, the method 400 proceeds to block 444 where the installation dynamic-link library is invoked. The installation dynamic-link library installs an activation key into the central hierarchical database, such as the registry, based on the product identifier. See block 446. The activation key allows the computing machine to quickly check and determine whether pieces of software for inhibiting software tampering are running on the computing machine without decoding the product identifier, which could be time consuming.

From Terminal C1 (FIG. 4F) the installation dynamic-link library installs encrypted protection profiles into the central hierarchical database, such as the registry. Upon the start-up of the computing machine, a log-on module of the piece of software, such as system software, is executed. See block 450. Next, at block 452, the log-on module decodes the product identifier stored in the central hierarchical database, such as the registry, and obtains the product class in which the piece of software is categorized. The method 400 proceeds to decision block 454 where a test is performed to determine whether protection is available for the identified product class. If the answer is NO to the test at decision block 454, the method 400 continues to Terminal L where it terminates execution. If the answer, on the other hand, to the test at decision block 454 is YES, the log-on module 308A attempts to load the obfuscated protection dynamic-link library onto the computing machine. See block 456. The method continues at another continuation terminal ("Terminal C2").

From Terminal C2 (FIG. 4G), the method 400 proceeds to block 458 where the method calculates the checksum of the protection dynamic-link library to be installed. Note that hereinafter the obfuscated protection dynamic-link library will be known as the protection dynamic-link library for brevity purposes. The method obtains a list of catalog files included in the system files. See block 460. Next, at block 462, the method takes a catalog file from a list and searches for a checksum contained in the catalog file. Decryption and verifying of the signature occurs. The method 400 proceeds to decision block 464 where a test is performed to determine whether there is a match between the two checksums. If the answer is NO to the test at decision block 464, the method 400 continues to another continuation terminal ("Terminal C3"). If, on the other hand, the answer to the test at decision block 464 is YES, the method 400 continues to another continuation terminal ("Terminal C4"). The processing steps discussed in connection with FIG. 4G describe a process by which a software image of the obfuscated protection dynamic-link library is verified to determine the originality of the software image (i.e., whether the software image was originally shipped or distributed by a desired software manufacturer.) If tampering has occurred, the verification process indicates that the software image of the obfuscated protection dynamic-link library to be loaded has been tampered with and security error measures, such as shutting down a computing machine, may have to be taken.

From Terminal C3 (FIG. 4H), the method 400 continues to decision block 466 where a test is performed to determine whether there are more catalog files to search. If the answer to the test at decision block 466 is YES, the method continues to another continuation terminal ("Terminal C5"). From Terminal C5 (FIG. 4G), the method 400 loops back to block 462 where the above-described processing steps are repeated. If, on the other hand, the answer to the test at decision block 466 is NO, the method 400 continues to block 468 where the protection dynamic-link library to be installed is not the original that came with the catalog files, signifying that it may have been tampered with. The method 400 then continues at another continuation terminal ("Terminal C7"). From Terminal C4 (FIG. 4H), the method 400 proceeds to decision block 470, where a test is performed to determine whether there is a protection dynamic-link library and the trusted catalog file. If the answer is NO to the test at decision block 470, the method 400 continues to Terminal C5 where it loops back to block 462 and the above-described processing steps are repeated. One suitable implementation of the test discussed in decision block 470 is a set of trust-checking application programming interfaces provided by Microsoft Windows. Otherwise, if the answer to the test at decision block 470 is YES, the method continues to another continuation terminal ("Terminal C6").

From Terminal C6 (FIG. 4I), the method 400 proceeds to block 472 where the method verifies the found catalog file and obtains state data as a return value by invoking a set of trust-checking application programming interfaces. The method obtains trust provider information using obtained state data via the set of trust-checking application programming interfaces. See block 474. Next, at block 476, the method obtains a base signer from a certificate chain using the obtained trust provider information. The method 400 proceeds to block 478 where the method validates the last element of the certificate chain using the context of the base signer. A test is performed to determine whether the last element contained a proper public key. See decision block 480. If the answer is YES to the test at decision block 480, the method 400 continues to Terminal C7. If, on the other hand, the answer to the test at decision block 480 is NO, the method continues to Terminal C5 where it loops back to block 462 and the above-described processing steps are repeated.

From Terminal C7 (FIG. 4J), the method 400 proceeds to decision block 482 where a test is performed to determine whether the protection dynamic-link library loaded successfully. If the answer to the test at decision block 482 is NO, the method initiates system shutdown. See block 484. The method 400 proceeds to Terminal L and terminates execution. If, on the other hand, the answer to the test at decision block 482 is YES, the method 400 proceeds to block 486 where the method creates a first timer running in a non-terminable thread. The method then continues on to two paths of execution represented by a continuation terminal ("Terminal C8") and the exit Terminal D. This splitting of execution paths at FIG. 4J is to illustrate the concurrency of several pieces of software running on the computing machine.

From Terminal C8 (FIG. 4K), the method 400 proceeds to decision block 488 where a test is performed to determine whether a pre-configured time period has expired. If the answer is NO, the method 400 loops back to decision block 488 where the above-described processing steps are repeated. If the answer to the test at decision block 488 is YES, the method 400 proceeds to block 490 where the method checks the activation key stored in the central hierarchical database, such as the registry, to decode the product class. Another test is performed to determine whether there is protection available for the decoded product class. See decision block 492. If the answer is YES to the test at decision block 492, the method 400 loops back to Terminal C8 where the above-discussed processing steps are repeated. If, on the other hand, the answer to the test at decision block 492 is NO, the core application programming interface has been tampered with and the method takes security measures, such as shutting down the computing machine. See block 494. The method 400 then continues to Terminal L and terminates execution.

From Terminal D (FIG. 4A), the method 400 proceeds to a set of method steps 406, which is defined between a continuation terminal ("Terminal E") and an exit terminal ("Terminal F"). The set of method steps 406 determines whether the computing machine belongs to a class of supportable machinery.

From Terminal E (FIG. 4L), the method 400 proceeds to block 496 where the method verifies the existence of a set of instructions on the central processing unit of the computing machine to obtain its identification. A test is performed to determine whether the set of instructions is available. See decision block 498. If the answer to the test at decision block 498 is NO, the central processing unit of the computing machine has an architecture that does not support self-identification. See block 499. One suitable conclusion is that the central processing unit can support pieces of software for inhibiting software tampering. The method 400 then continues to the exit Terminal F. If, on the other hand, the answer to the test at decision block 498 is YES, the log-on module communicates with the protection dynamic-link library to access the encrypted protection profile relating to the excluded central processing unit classes. See block 497. In other words, there are files installed on the computing machine that describe various parameters with which the computing machine operates. For example, language files describe the language in which an operating system presents information to users. As another example, hardware files describe the pieces of computing machinery that the operating system supports. The problem is that files can easily be tampered with by a hacker or malicious software. Contained within the encrypted protection profile are checksums that signify the original files installed on the computing machine. If the original files were to be tampered with, the checksums of the tampered files and the checksums stored in the encrypted protection profile will not match, signifying that the original files have been tampered with. For example, if a hacker were to modify the hardware files to fool the operating system into supporting a non-supportable computing machine, the checksum of the modified hardware files are likely to be different than the checksum stored in the encrypted protection file, hence allowing a determination of tampering. Returning to FIG. 4A, the log-on module passes into the protection dynamic-link library of a random salt value that is used to enhance security. See block 495. The random salt value makes it difficult for a hacker to defeat or intercept a functional invocation or call. As will be discussed hereinbelow, the random salt value is used in the calculation of a checksum based on the random salt value and data sent by the protection dynamic-link library. That checksum is compared against the checksum calculated by the protection dynamic-link library to determine if tampering has occurred. The method 400 then continues to another continuation terminal ("Terminal E1").

From Terminal E1 (FIG. 4M), the method 400 proceeds to block 493 where the protection dynamic-link library decrypts an encrypted protection profile ("profile") using a private library key. The protection dynamic-link library compares the profile to the system. See block 491. Next, at decision block 489, a test is performed to determine whether the profile has been found. Each profile has a name that preferably is a number of bits, such as 64 bits. If the answer is NO to the test at decision block 489, the method 400 loops back to block 493 where the above-described processing steps are repeated. If, on the other hand, the answer to the test at decision block 489 is YES, the method 400 proceeds to block 487, where the protection dynamic-link library computes a checksum for the identity of the profile, its data, the comparison result, and the salt value. The protection dynamic-link library returns a result data structure, a verifier blob of the profile, and the computed checksum. See block 485. The method then continues to another continuation terminal ("Terminal E2").

From Terminal E2 (FIG. 4N), the method 400 proceeds to block 483 where the log-on module uses a private calling key to decrypt the verifier blob and obtains a verifier checksum. The log-on module validates the signature of the checksum using a public calling key. See block 481. Next, at block 479, the log-on module computes a checksum from the decrypted verifier checksum, the received result data structure, and the salt value. The method 400 proceeds to block 477 where the method prepares the checksums computed by the log-on module and the protection dynamic-link library. A test is performed to determine whether the checksums are a match. See decision block 475. If the answer is NO to the test at decision block 475, the method 400 continues to Terminal L and terminates execution. Otherwise, the answer to the test at decision block 475 is YES, and the method 400 proceeds to another continuation terminal ("Terminal E3").

From Terminal E3 (FIG. 4O), the method 400 proceeds to block 473 where the method extracts a list of excluded computing machine classes from the profile. The method then causes the computing machine to review CPU information (e.g., vendor identity, type, family, model number, brand identity, and feature set). See block 471. Next, at decision block 469, a test is performed to determine whether the vendor identity is on the excluded list. If the answer is NO to the test at decision block 469, the method 400 continues to Terminal F. Otherwise, the answer to the test is YES, and the method continues to another continuation terminal ("Terminal E4").

From Terminal E4 (FIG. 4P), the method 400 continues to decision block 467 where a test is performed to determine whether the type, family, and model number are on the excluded list. If the answer is YES to the test at decision block 467, the method 400 continues at another continuation terminal ("Terminal E7"). Otherwise, if the answer to the test at decision block 467 is NO, the method 400 continues to another decision block 465 where a test is performed to determine whether the brand identity and the feature set are on the excluded list. If the answer is YES to the test at decision block 465, the method 400 continues to Terminal E7. Otherwise, if the answer to the test at decision block 465 is NO, the method 400 continues to another continuation terminal ("Terminal E5").

From Terminal E5 (FIG. 4Q), the method 400 continues to decision block 463 where a test is performed to determine whether extended instructions to determine the CPU or the central processing unit of the computing machine identity exists. If the answer to the test at decision block 463 is NO, the method continues to Terminal F. Otherwise, if the answer to the test at decision block 463 is YES, the method invokes the extended instructions to obtain the name of the CPU or the central processing unit of the computing machine. See block 461. Next, at block 459, the method invokes the extended instructions to obtain the cache size of the central processing unit. The method 400 continues at another continuation terminal ("Terminal E6").

From Terminal E6 (FIG. 4R), the method 400 proceeds to decision block 457 where a test is performed to determine whether the name of the center processing unit is on the excluded list. If the answer to the test at decision block 457 is YES, the method continues to Terminal E7. If the answer to the test at decision block 457 is NO, another test is performed to determine whether the cache size of the CPU is on the excluded list. See decision block 455. If the answer is YES to the test at decision block 455, the method 400 continues to Terminal E7. Otherwise, if the answer is NO, the method 400 continues to Terminal F.

From Terminal E7 (FIG. 4S), the method issues error messages that no protection is available on the computer machine and initiates system shutdown. See block 455. The method 400 then continues to Terminal L and terminates execution.

From Terminal F (FIG. 4B), the method 400 proceeds to a set of method steps 408 defined between a continuation terminal ("Terminal G") and an exit terminal ("Terminal H"). The set of method steps 408 verifies whether the install files have been tampered with.

From Terminal G (FIG. 4S), the log-on module communicates with a protection dynamic-link library to access an encrypted protection profile relating to critical files on the computing machine. See block 453. The steps 495-475 (in the illustrated sequence) of FIGS. 4L-4N are executed in the context of finding an encrypted protection profile relating to critical files on the computing machine. See block 451. Next, at block 449, the method extracts a list of critical files from the profile. A test is performed to determine whether the critical files on the computing machine have been changed. See decision block 447. If the answer to the test at decision block 447 is YES, the method 400 continues to Terminal L and terminates execution. Otherwise, the answer to the test at decision block 400 is NO, the method continues to Terminal H. Please note that processing steps between Terminal G and Terminal H can be concurrently executed so as to continuously check whether critical files on a computing machine have been changed or tampered with.

From Terminal H (FIG. 4B), the method 400 proceeds to a set of method steps 410 defined between a continuation terminal ("Terminal I") and an exit terminal ("Terminal J"). The set of method steps 410 determines whether the registry has been tampered with.

From Terminal I (FIG. 4T), upon start-up, the log-on module invokes a protection function of the protection dynamic-link library to protect the keys and values of the registry of the system context. See block 445. The protection dynamic-link library creates a thread to protect various keys and values of the registry of the system context. See block 443. Next, at block 441, the protection dynamic-link library returns a handle to the just created thread to the log-on module. The method 400 proceeds to block 439 where the method creates a timer to check the continuance of the thread protecting the keys and values of the registry at the system context. Next, the method 400 proceeds to three independent paths of execution, which are represented by a continuation terminal ("Terminal I2"), decision block 437, and another continuation terminal ("Terminal I4"). These independent paths of execution indicate concurrency. A test is performed at decision block 437 to determine whether a pre-configured time period has expired. If the answer is NO to the test at decision block 437, the method 400 proceeds to another continuation terminal ("Terminal I3") and loops back to decision block 437 where the above-described processing step is repeated. Otherwise, if the answer to the test at decision block 437 is YES, the method 400 continues to another continuation terminal ("Terminal I1").

From Terminal I1 (FIG. 4U), the method 400 proceeds to decision block 435 where a test is performed to determine whether the thread has terminated. If the answer to the test at decision block 435 is NO, the method continues to another decision block 433 where another test is performed to determine whether the thread has been suspended. If the answer to the test at decision block 433 is NO, the method 400 continues to Terminal I3 and loops back to decision block 437 where the above-described processing steps are repeated. If the answers to the tests at decision blocks 435, 433, are YES, the method 400 proceeds to block 431 where the system is believed to have been tampered with and the method initiates system shutdown. The method 400 then continues to Terminal L and terminates execution.

From Terminal I2 (FIG. 4V) the method 400 proceeds to block 429 where the thread communicates with a protection dynamic-link library to access a list of system registry keys and values to be protected. The steps 495-475 (in the illustrated sequence) of FIGS. 4L-4N are executed. See block 427. Next, at block 425, the thread subscribes for notification of any changes to protect registry keys. A test is performed at decision block 423 to determine whether there is a notification of a change. If the answer to the test at decision block 423 is NO, the method loops back to decision block 423 where the above-described processing step is repeated. Otherwise, the answer to the test at decision block 423 is YES, and the method fixes the tampered key and its value. See block 421. The method 400 then loops back to decision block 423 where the above-described processing steps are repeated.

From Terminal I4 (FIG. 4W), the method 400 proceeds to block 419 where upon log-on by a user, the log-on module invokes a protection function of the protection dynamic-link library to protect the keys and values of the registry of the user context. The protection dynamic-link library creates a thread to protect various keys and values of the registry at the user context. See block 417. Next, at block 415, the protection dynamic-link library returns a handle to the just created thread to the log-on module. The method 400 proceeds to block 413 where the method creates a timer to check the continuance of the thread protecting the keys and values of the registry of the user context. The steps 437-421 of FIGS. 4T-4U (in the illustrated sequence) are executed for the user context. The method 400 then continues to Terminal J.

From Terminal J (FIG. 4B), the method 400 proceeds to a set of method steps 412 defined between a continuation terminal ("Terminal K") and an exit terminal ("Terminal L"). The set of methods 412 determines whether services have been tampered with or whether unauthorized services are executing. From Terminal K (FIG. 4X), upon start-up, the log-on module invokes a protection function of the protection dynamic-link library to inhibit the execution of unauthorized services. The protection dynamic-link library creates a thread to inhibit the execution of unauthorized services. See block 407. Next, at block 405, the protection dynamic-link library returns a handle to the just created thread to the log-on module. The method 400 then continues to block 403 where the method creates a timer to check the continuance of the thread inhibiting the execution of unauthorized services. The steps 437-431 of FIGS. 4T-4U are executed. See block 401. Next, at block 401A, the thread communicates with the protection dynamic-link library to access an encrypted protection profile relating to a list of unauthorized services. The method 400 then continues to another continuation terminal ("Terminal K1").

From Terminal K1 (FIG. 4Y), the steps 495-475 of FIGS. 4L-4N are executed. A test is performed at decision block 401C to determine whether an unauthorized service is running. If the answer to the test at decision block 401C is NO, the method 400 continues to another continuation terminal ("Terminal K2"). Otherwise, if the answer is YES to the test at decision block 401C, the method 400 proceeds to block 401D where the method stops all services that are dependent on the unauthorized service. The unauthorized service is then deleted from the execution. See block 401E.

From Terminal K2 (FIG. 4J), the method 400 proceeds to decision block 401F where a test is performed to determine whether there are more unauthorized services. If the answer to the test at decision block 401F is YES, the method continues to another continuation terminal ("Terminal K3"). From Terminal K3 (FIG. 4Y), the method 400 loops back to decision block 401C where the above-described processing steps are repeated. Otherwise, if the answer to the test at decision block 401F is NO, the method 400 proceeds to block 401G where the thread sleeps for a pre-configured period of time. The method 400 then loops back to decision block 401C via Terminal K3 where the above-described processing steps are repeated. The steps described in connection with the set of method steps 412 defined between the Terminals K and L are preferably concurrently executed to other sets of method steps.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method of operating a computing machine to inhibit tampering with a piece of software running on the computing machine, the method comprising:
   upon start-up of a computing machine, invoking by a log-on module a protection function of an obfuscated dynamic link library to create a first thread that determines whether first keys and values have been tampered with and resets the first keys and values when it is determined that the first keys and values have been tampered with, the first keys and values associated with a system and stored in a central hierarchical database, and the obfuscated protection dynamic-link library obfuscated by renaming symbols in an assembly of a protection dynamic-link library; and
   upon log-on to the computing machine by a user, invoking by the log-on module the protection function of the obfuscated dynamic link library to create a second thread that determines whether second keys and values have been tampered with and resets the second keys and values when it is determined that the second keys and values have been tampered with, the second keys and values associated with the user and stored in the central hierarchical database.

2. The method of claim 1, further comprising subscribing to receive a change notification for each key of the central hierarchical database that is to be protected from tampering.

3. The method of claim 2, further comprising receiving the change notification of a change in a key and fixing the key, its value, or both so as to inhibit software tampering.

4. The method of claim 3, further comprising providing a handle of the first thread to a first timer to check the continuance of the execution of the first thread to protect the keys and values of the central hierarchical database associated with the system.

5. The method of claim 4, further comprising after a pro-configured time period has expired, a piece of software associated with the first timer initiating system shutdown if the first thread has been terminated or suspended.

6. The method of claim 5, further comprising communicating by the first thread with the obfuscated protection dynamic-link library to access an encrypted protection profile relating to system keys and values in the central hierarchical database.

7. The method of claim 3, further comprising providing a handle of the second thread to a second timer to check the continuance of the execution of the second bread to protect the keys and values of the central hierarchical database associated with the user.

8. The method of claim 7, further comprising after a pre-configured time period has expired, a piece of software associated with the second timer initiating system shutdown if the second thread has been terminated or suspended.

9. The method of claim 8, further comprising communicating by the second thread with the obfuscated protection dynamic-link library to access an encrypted protection profile relating to user registry keys and values in the central hierarchical database.

10. A computer-readable storage medium having computer-executable instructions thereon for implementing a method for inhibiting software tampering, comprising:
    upon start-up of a computing machine, invoking by a log-on module a protection function of an obfuscated dynamic link library to create a first thread that monitors and protects first keys and values from tampering, the first keys and values associated with a system and stored in a central hierarchical database; and
    upon log-on to the computing machine by a user, invoking by the log-on module the protection function of the obfuscated dynamic link library to create a second thread that determines whether second keys and values have been tampered with and resets the second keys and values when it is determined that the second keys and values have been tampered with, the second keys and values associated with the user and stored in the central hierarchical database.

11. The computer-readable storage medium of claim 10, further comprising subscribing to receive a change notification for each key of the central hierarchical database that is to be protected from tampering.

12. The computer-readable storage medium of claim 11, further comprising receiving the change notification of a change in a key and fixing the key, its value, or both so as to inhibit software tampering.

13. The computer-readable storage medium of claim 12, further comprising providing a handle of the first thread to a first timer to check the continuance of the execution of the first thread to protect the keys and values of the central hierarchical database associated with the system.

14. The computer-readable storage medium of claim 13, further comprising after a pre-configured time period has expired, a piece of software associated with the first timer initiating system shutdown if the first thread has been terminated or suspended.

15. The computer-readable storage medium of claim 14, further comprising communicating by the first thread with the obfuscated protection dynamic-link library to access an encrypted protection profile relating to system keys and values in the central hierarchical database.

16. The computer-readable storage medium of claim 12, further comprising providing a handle of the second thread to a second timer to check the continuance of the execution of the second thread to protect the keys and values of the central hierarchical database associated with the user.

17. The computer-readable storage medium of claim 16, further comprising after a pre-configured time period has expired, a piece of software associated with the second timer initiating system shutdown if the second thread has been terminated or suspended.

18. The computer-readable storage medium of claim 17, further comprising communicating by the second thread with the obfuscated protection dynamic-link library to access an encrypted protection profile relating to user registry keys and values in the central hierarchical database.

19. A system for inhibiting software tampering, comprising:
    a processor;
    means, executed by said processor, for invoking by a log-on module, upon start-up of a computing machine, a protection function of an obfuscated dynamic link library to create a first thread that monitors and protects first keys and values from tampering, the first keys and values associated with a system and stored in a central hierarchical database of the computing machine;
    means, executed by said processor, for intermittently checking the continuance of execution of the first thread; and means, executed by said processor, for invoking by the log-on module, upon log-on to the computing machine by a user, the protection function of the obfuscated dynamic link library to create a second thread that monitors and protects second keys and values from tampering, the second keys and values associated with the user and stored in the central hierarchical database of the computing machine.

20. The system of claim 19, further comprising subscribing to receive a change notification for each key of the central hierarchical database that is to be protected from tampering, receiving the change notification of a change in a key and fixing the key, its value, or both so as to inhibit software tampering.

* * * * *

UNITED STATES PATENT AND TRADEMARK OFFICE
CERTIFICATE OF CORRECTION

| | | |
|---|---|---|
| PATENT NO. | : 7,721,340 B2 | Page 1 of 1 |
| APPLICATION NO. | : 11/061399 | |
| DATED | : May 18, 2010 | |
| INVENTOR(S) | : Wei Wu et al. | |

It is certified that error appears in the above-identified patent and that said Letters Patent is hereby corrected as shown below:

In column 15, lines 42-43, in Claim 5, delete "pro-configured" and insert -- pre-configured --, therefor.

In column 15, line 53, in Claim 7, delete "bread" and insert -- thread --, therefor.

Signed and Sealed this

Seventeenth Day of May, 2011

David J. Kappos
*Director of the United States Patent and Trademark Office*